US011059249B2

(12) United States Patent
Krichevsky

(10) Patent No.: US 11,059,249 B2
(45) Date of Patent: Jul. 13, 2021

(54) FOOTWEAR AND METHOD OF FORMATION

(71) Applicant: Under Armour, Inc., Baltimore, MD (US)

(72) Inventor: Bradley Krichevsky, Baltimore, MD (US)

(73) Assignee: UNDER ARMOUR, INC., Baltimore, MD (US)

(*) Notice: Subject to any disclaimer, the term of this patent is extended or adjusted under 35 U.S.C. 154(b) by 285 days.

(21) Appl. No.: 16/011,702

(22) Filed: Jun. 19, 2018

(65) Prior Publication Data

US 2018/0361697 A1 Dec. 20, 2018

Related U.S. Application Data

(60) Provisional application No. 62/521,666, filed on Jun. 19, 2017.

(51) Int. Cl.
*B29D 35/00* (2010.01)
*A43B 13/32* (2006.01)
(Continued)

(52) U.S. Cl.
CPC .......... *B29D 35/0054* (2013.01); *A43B 13/32* (2013.01); *B29D 35/126* (2013.01);
(Continued)

(58) Field of Classification Search
CPC .............. B29D 35/0054; B29D 35/126; B29D 35/146; B29D 35/04; A43B 13/32; A43B 23/0235; A43B 23/0255; A43B 23/026; A43B 1/0072; A43B 3/0078; A43B 23/022; A43B 23/024
(Continued)

(56) References Cited

U.S. PATENT DOCUMENTS 1,772,179 A 8/1930 Finkelstein
1,867,679 A 7/1932 Riehle et al.
(Continued)

FOREIGN PATENT DOCUMENTS

DE 1931800 A1 3/1970
DE 4401849 8/1994
(Continued)

OTHER PUBLICATIONS

Extended European Search Report dated Mar. 21, 2017 cited in related EP Application 14835903.7, 7 pages.
(Continued)

*Primary Examiner* — Philip C Tucker
*Assistant Examiner* — Vicki Wu
(74) *Attorney, Agent, or Firm* — Edell, Shapiro & Finnan, LLC

(57) ABSTRACT

An article of footwear including a compression molded upper is disclosed. A composite structure including several layers is placed under heat and pressure to form a laminate. One layer of the composite is an optical effect layer possessing an aesthetic that differs from one or more of the other layers of the composite structure. A plurality of holes are cut through one or more of the layers of the laminate to expose the optical effect layer.

13 Claims, 13 Drawing Sheets

(51) Int. Cl.
  *A43B 23/02* (2006.01)
  *B29D 35/04* (2010.01)
  *B29D 35/12* (2010.01)
  *B29D 35/14* (2010.01)
  *A43B 1/00* (2006.01)
  *A43B 3/00* (2006.01)
  *A43B 23/24* (2006.01)

(52) U.S. Cl.
  CPC ........... *A43B 1/0072* (2013.01); *A43B 3/0078* (2013.01); *A43B 23/022* (2013.01); *A43B 23/026* (2013.01); *A43B 23/0235* (2013.01); *A43B 23/0255* (2013.01); *A43B 23/24* (2013.01); *B29D 35/04* (2013.01); *B29D 35/146* (2013.01)

(58) Field of Classification Search
  USPC ........................................................ 156/245
  See application file for complete search history.

(56) References Cited

U.S. PATENT DOCUMENTS

| | | | |
|---|---|---|---|
| 2,622,052 A * | 12/1952 | Chandler | A43B 3/0078 36/45 |
| 3,642,563 A | 2/1972 | Davis et al. | |
| 3,694,940 A | 10/1972 | Stohr | |
| 3,967,390 A | 7/1976 | Anfruns | |
| 4,294,022 A | 10/1981 | Stocki et al. | |
| 5,187,883 A | 2/1993 | Penney | |
| 5,339,544 A | 8/1994 | Caberlotto | |
| 5,913,592 A | 6/1999 | Moore | |
| 6,076,283 A | 6/2000 | Boie | |
| 6,173,511 B1 | 1/2001 | Perrault | |
| 6,299,962 B1 | 10/2001 | Davis et al. | |
| 6,558,784 B1 | 5/2003 | Norton et al. | |
| 6,670,029 B2 | 12/2003 | Norton et al. | |
| 6,805,610 B2 | 10/2004 | Luk | |
| 7,082,703 B2 | 8/2006 | Greene et al. | |
| 7,316,083 B2 | 1/2008 | Labonte | |
| 7,533,479 B2 | 5/2009 | LaBonte | |
| 7,739,810 B2 | 6/2010 | Luedecke et al. | |
| 7,793,434 B2 | 9/2010 | Sokolowski et al. | |
| 7,805,860 B2 | 10/2010 | Fliri | |
| 8,321,984 B2 | 12/2012 | Dojan et al. | |
| 8,434,245 B2 | 5/2013 | Bell et al. | |
| 8,544,191 B2 | 10/2013 | Marvin et al. | |
| 8,769,846 B1 | 7/2014 | Williams | |
| 9,101,179 B2 | 8/2015 | Marvin et al. | |
| 2002/0071946 A1 | 6/2002 | Norton et al. | |
| 2002/0077014 A1 | 6/2002 | Gabbrielli | |
| 2003/0172555 A1 | 9/2003 | Chu | |
| 2004/0064975 A1 | 4/2004 | Huff | |
| 2005/0081406 A1 | 4/2005 | Hoffer et al. | |
| 2005/0274040 A1 | 12/2005 | Fuerst | |
| 2006/0112594 A1 | 6/2006 | Kilgore | |
| 2007/0011915 A1 | 1/2007 | Allen | |
| 2007/0144039 A1 | 6/2007 | Fliri | |
| 2007/0199210 A1 | 8/2007 | Vattes et al. | |
| 2007/0204485 A1 | 9/2007 | Kilgore | |
| 2008/0028544 A1 | 2/2008 | Park | |
| 2008/0028635 A1 | 2/2008 | Park | |
| 2008/0086913 A1 | 4/2008 | Nawachi et al. | |
| 2008/0127426 A1 | 6/2008 | Morlacchi | |
| 2008/0141469 A1 | 6/2008 | Park | |
| 2008/0250668 A1 | 10/2008 | Marvin et al. | |
| 2009/0013555 A1 | 1/2009 | Vitulli | |
| 2009/0077833 A1 | 3/2009 | Kokavec | |
| 2009/0293318 A1 | 12/2009 | Garneau | |
| 2010/0115792 A1 | 5/2010 | Muller | |
| 2010/0133715 A1 | 6/2010 | Park | |
| 2010/0139853 A1 | 6/2010 | Park | |
| 2010/0170106 A1 | 7/2010 | Brewer et al. | |
| 2010/0186255 A1 | 7/2010 | Avar et al. | |
| 2010/0205716 A1 | 8/2010 | Kim | |
| 2011/0005105 A1 | 1/2011 | Hong | |
| 2011/0078922 A1 | 4/2011 | Cavaliere et al. | |
| 2011/0088282 A1 | 4/2011 | Dojan et al. | |
| 2011/0119956 A1 | 5/2011 | Borel et al. | |
| 2011/0214313 A1 | 9/2011 | Dervin et al. | |
| 2011/0265347 A1 | 11/2011 | Leary et al. | |
| 2011/0265348 A1 | 11/2011 | Schmutte | |
| 2011/0308108 A1 | 12/2011 | Berns et al. | |
| 2012/0000094 A1 | 1/2012 | Fliri | |
| 2012/0144699 A1 | 6/2012 | Eggert et al. | |
| 2012/0216424 A1 | 8/2012 | Lyden | |
| 2012/0272548 A1 | 11/2012 | Downard et al. | |
| 2012/0285039 A1 | 11/2012 | Lazaris | |
| 2012/0297645 A1 | 11/2012 | Berbert | |
| 2013/0008053 A1 | 1/2013 | Nishiwaki et al. | |
| 2013/0031800 A1 * | 2/2013 | Ou | A43B 3/0078 36/45 |
| 2013/0036629 A1 | 2/2013 | Bramani | |
| 2013/0047471 A1 | 2/2013 | Liang | |
| 2013/0097891 A1 | 4/2013 | Moretti et al. | |
| 2013/0232820 A1 | 9/2013 | Bramani | |
| 2013/0251955 A1 | 9/2013 | Lee et al. | |
| 2013/0291293 A1 | 11/2013 | Jessiman et al. | |
| 2013/0291400 A1 | 11/2013 | Rammig | |
| 2013/0303041 A1 * | 11/2013 | Kim | B32B 27/40 442/1 |
| 2013/0340289 A1 | 12/2013 | Thevenoud | |
| 2014/0059886 A1 | 3/2014 | Lyttle et al. | |
| 2014/0082961 A1 | 3/2014 | Marvin et al. | |
| 2014/0115922 A1 | 5/2014 | Marvin et al. | |
| 2014/0230284 A1 | 8/2014 | Craig et al. | |
| 2014/0246147 A1 | 9/2014 | Herandez Herandez | |
| 2014/0283410 A1 | 9/2014 | Marvin | |
| 2015/0101134 A1 | 4/2015 | Manz et al. | |
| 2015/0223567 A1 | 8/2015 | Lee et al. | |
| 2017/0273405 A1 * | 9/2017 | Kilgore | A43D 111/00 |

FOREIGN PATENT DOCUMENTS

| | | |
|---|---|---|
| EP | 0152033 | 8/1985 |
| EP | 0769258 A1 | 4/1997 |
| EP | 1415558 | 5/2004 |
| FR | 2180146 A5 | 11/1973 |
| GB | 2480641 A | 11/2011 |
| JP | 11032805 | 2/1999 |
| JP | 2011045701 | 3/2011 |
| KR | 20090003694 A | 1/2009 |
| WO | 199003744 | 4/1990 |
| WO | 9943229 | 9/1999 |
| WO | 2007038487 | 4/2007 |

OTHER PUBLICATIONS

Written Opinion of the International Searching Authority for PCT/US2014/050900, dated Jan. 22, 2015, 3 pages.

* cited by examiner

FOOTWEAR AND METHOD OF FORMATION

CROSS-REFERENCE TO RELATED APPLICATIONS

This application claims priority under 35 U.S.C. § 119(e) to U.S. Provisional Patent Application Ser. No. 62/521,666, entitled "Footwear And Method Of Formation," filed Jun. 19, 2017, the disclosure of which is incorporated herein by reference in its entirety for all purposes.

FIELD OF THE INVENTION

The present invention is directed toward an article of footwear and a method of forming an upper for the article of footwear, such as a running shoe.

BACKGROUND OF THE INVENTION

Performance footwear, such as running shoes, is designed for comfort and durability. There is also an increasing emphasis on providing aesthetically pleasing performance footwear. However, often, complex footwear construction methods (i.e., sophisticated and expensive stitching and/or injection molding techniques) are required to provide comfort and durability for performance footwear, and the complexity only increases as various aesthetically pleasing designs are pursued or incorporated into a shoe (i.e., additional pieces, fabrics, patterns, or stiches may be required to achieve a desired aesthetic). Thus, it would be desirable to provide performance footwear that is comfortable (i.e., lightweight, breathable, etc.) durable, and aesthetically pleasing while avoiding the use of extra seams and/or stitches.

BRIEF SUMMARY OF THE INVENTION

The present invention is directed toward an article of footwear and a method of forming the article footwear and, more specifically, to an upper for an article of footwear and a method of forming the upper. The invention may be embodied as an article of footwear, an upper for an article of footwear, a method of forming the article of footwear, a method of forming the upper for the article of footwear, and a system for forming the upper and/or the article of footwear.

In an embodiment, the article of footwear includes a sole structure and an upper with an exterior side and an interior side. The upper defines an interior cavity operable to receive a foot of a wearer and at least a portion of the upper comprises a textile laminate including an exterior textile layer defining the exterior side of the upper, a foam layer, an interior textile layer defining the interior side of the upper, and an optical effect layer. The optical effect layer is viewable along the exterior side of the upper.

In an embodiment, the method of forming the upper includes compression molding multiple layers of fabric to form a fabric laminate defining a rearfoot portion or forefoot portion of the upper. The compression molding forms perforations in the fabric laminate. The fabric laminate is aligned within a cutting apparatus by aligning the perforations with the blades and a plurality of holes are cut through one or more of the multiple layers of the fabric laminate with the cutting apparatus.

In another embodiment, the method of forming the upper includes compression molding multiple layers of fabric to form a fabric laminate defining a rearfoot portion or forefoot portion of the upper. However, in this embodiment, the compression molding forms a plurality of holes in the fabric laminate. An optical effect layer of material is laminated to an innermost layer of the fabric laminate to provide an aesthetic effect that can be seen through the plurality of holes.

BRIEF DESCRIPTION OF THE SEVERAL VIEWS OF THE DRAWINGS

Like numerals identify like components throughout the figures.

DETAILED DESCRIPTION OF THE INVENTION

Figure 1A:
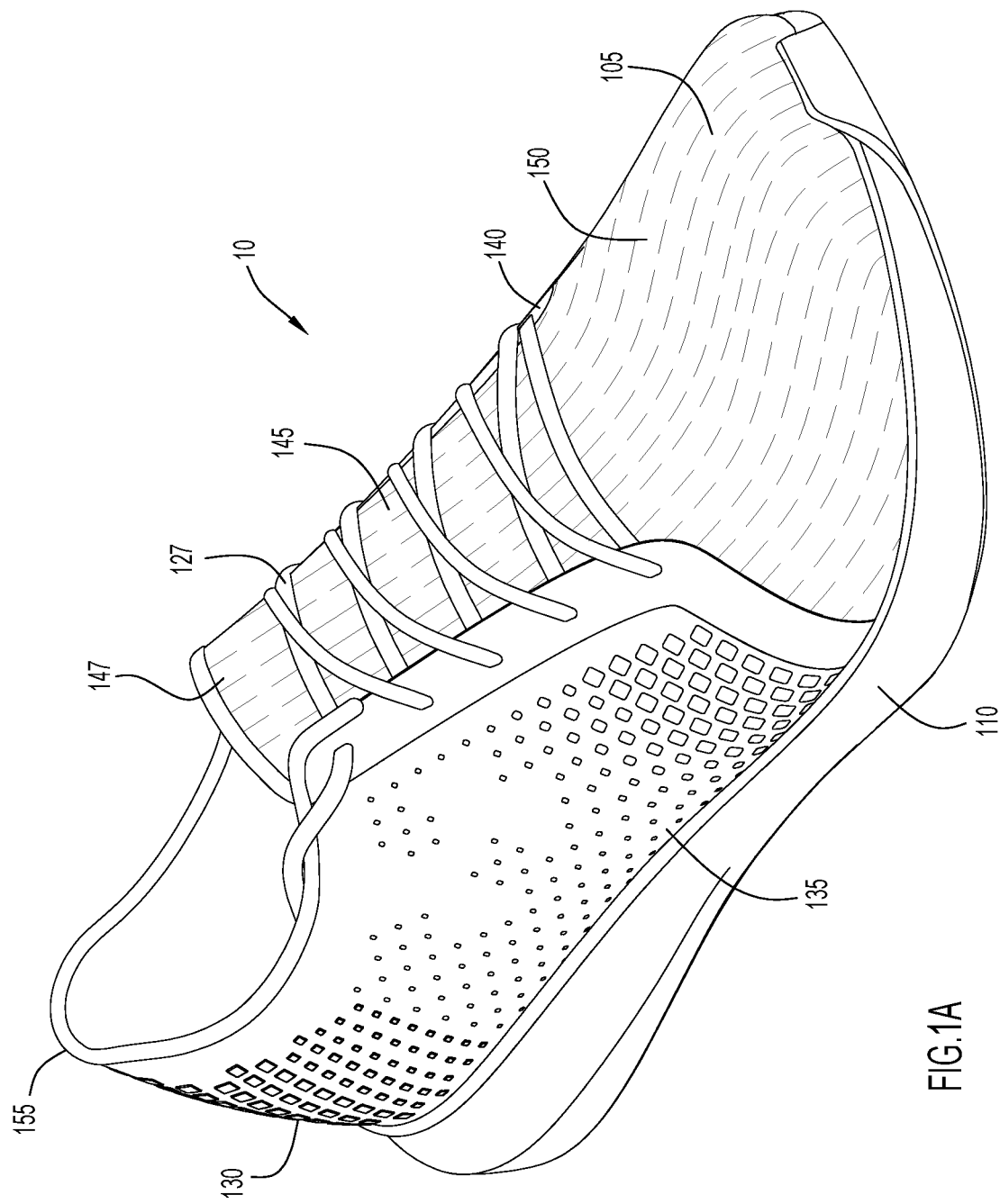
FIG. 1A is a front perspective view an article of footwear in accordance with an embodiment of the invention, showing the lateral footwear side (footwear configured for a right foot).
Figure 1B:
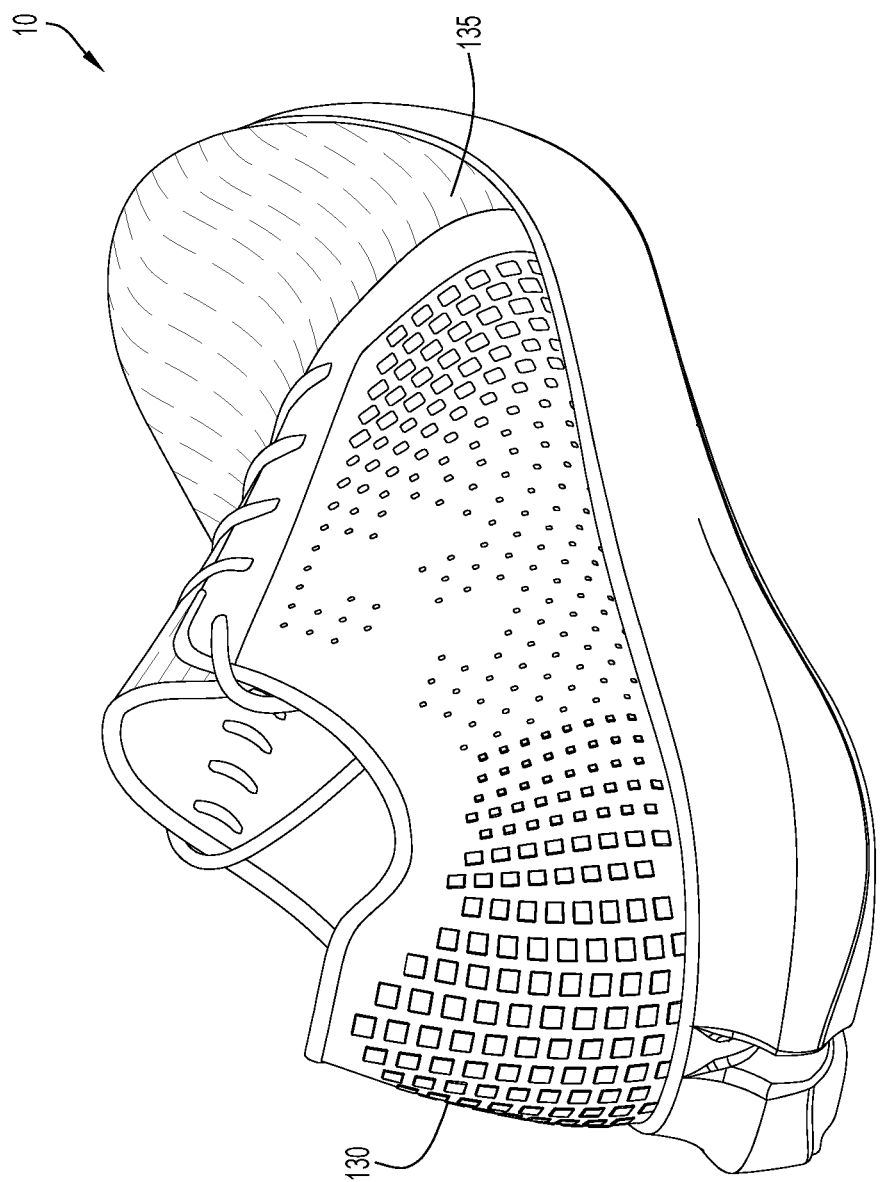
FIG. 1B is a rear perspective view of the article of footwear shown in FIG. 1A.
Figure 1C:
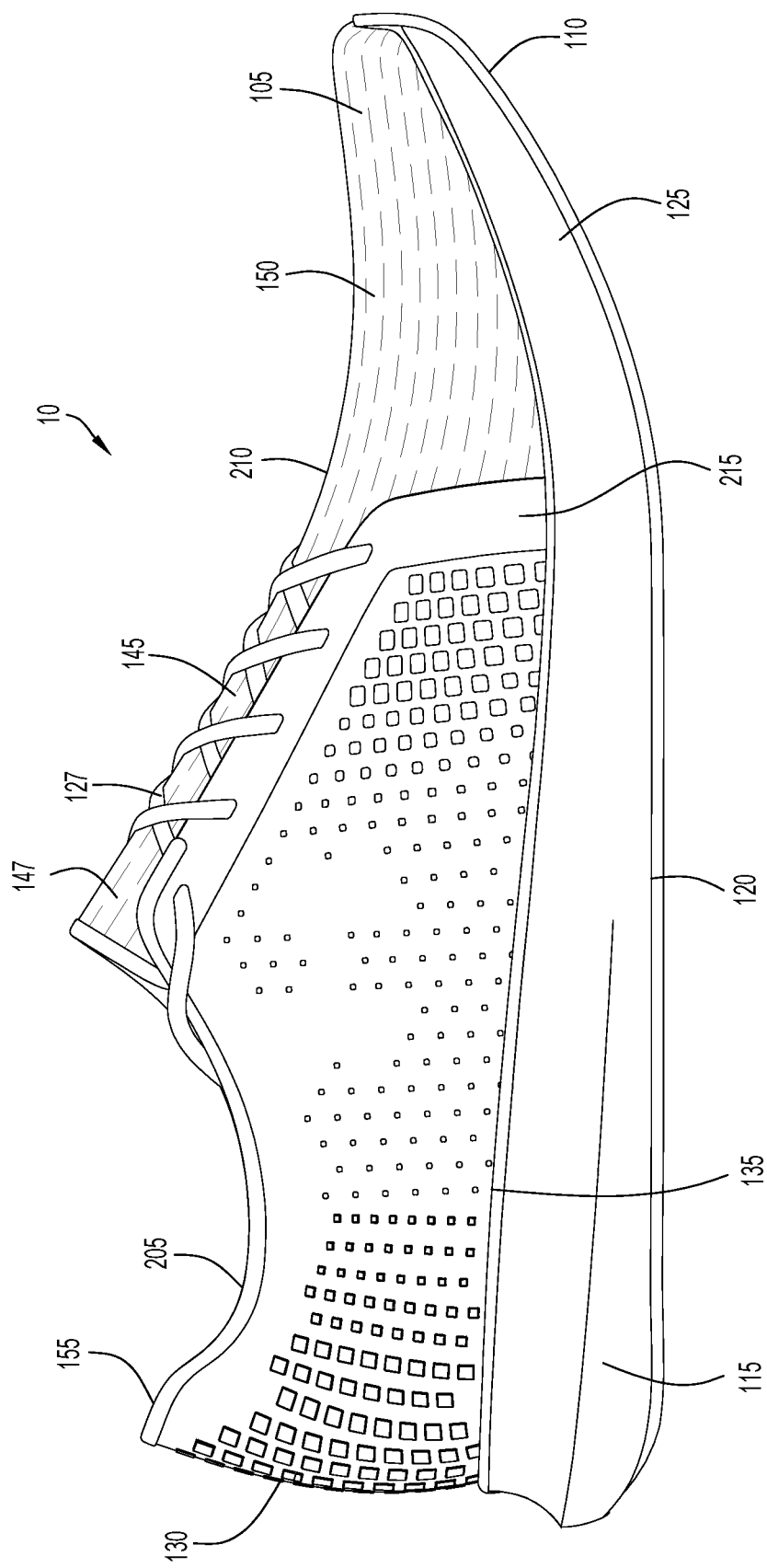
FIG. 1C is a side view in elevation of the article of footwear shown in FIG. 1A, showing the lateral side footwear side (footwear configured for a right foot).
Figure 1D:
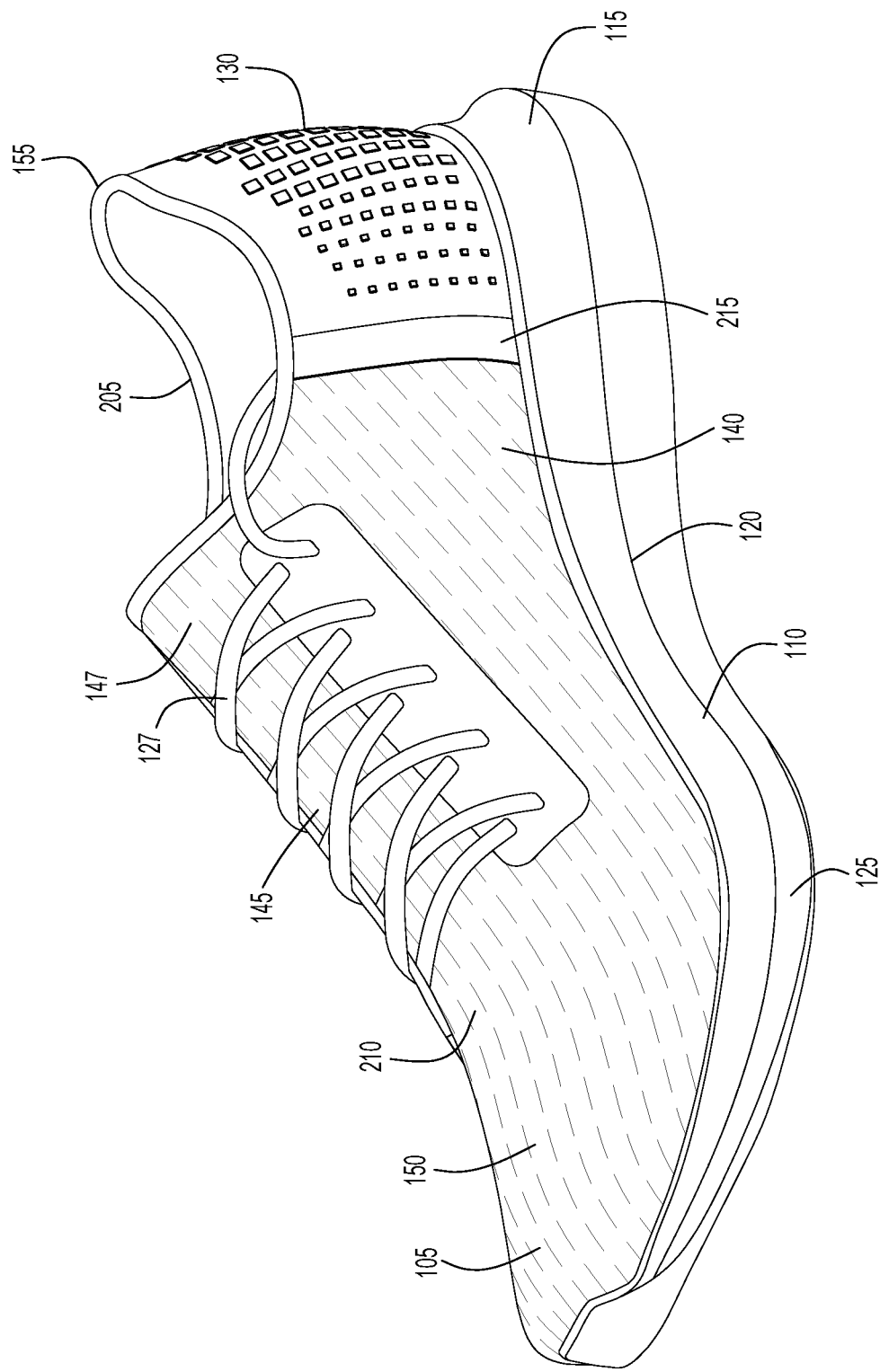
FIG. 1D is a front perspective view of the article of footwear shown in FIG. 1A, showing the medial side footwear side (footwear configured for a right foot).

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Now referring generally to the Figures, an article of footwear (i.e., a shoe) and a method of forming an article of footwear, or portions thereof, are presented herein. More specifically, a method of forming an upper for integration into an article of footwear is presented herein. The upper is generally formed or shaped via a number of operations that begin with compression molding operations. The compression molding operations form a textile laminate having unique geometries (e.g., predetermined macrostructures and microstructures) and/or features. In particular, compression molding techniques may be utilized to form an upper with openings and/or perforations, various layers of materials exposed, and/or various other features (e.g., eyelets/grommets) formed therein. Among other advantages, the openings and layer exposure features may improve the breathability of an article of footwear while also improving the aesthetic of the article of footwear.

Turning to FIGS. 1A, 1B, 1C and 1D, an article of footwear 10 in accordance with an embodiment of the present invention includes an upper 105 coupled to (e.g., mounted on) a sole structure 110. The article of footwear 10 defines several regions corresponding with various parts of a foot. Specifically, the footwear 10 defines a rear footwear region 115 (see FIGS. 1C and 1D) generally corresponding with the rear of the foot (e.g., the hindfoot including the heel); an intermediate footwear region 120 (see FIGS. 1C and 1D) disposed forward the rear region and generally corresponding to the midfoot (e.g., the arched, instep, and ball areas of the foot); and a forward footwear region 125 (see FIGS. 1B and 1C) disposed forward of intermediate region and generally corresponding to the forefoot (e.g., the toes of the foot). The article of footwear 10 may further include a fastener 127 (e.g., a shoe lace).

The upper 105 includes a heel 130, a lateral side 135, a medial side 140, an instep 145, and a toe cage or box 150. The heel 130 includes and/or forms a rear portion of upper 105 and is generally configured to extend along the heel of the foot. The lateral side 135 spans through a longitudinal length of footwear 10, extending along the lateral side of the foot. Similarly, the medial side 140 extends along the longitudinal length of footwear 10 such that it extends along the medial side of the foot. The instep 145 is positioned between the lateral side 135 and the medial side 140 and extends over the instep of the foot. The instep 145 generally includes tongue 147 which, in the depicted embodiment, is integrally formed with the medial side 140. Finally, the toe cage 150 defines the forward area of the upper 105 and houses the toes of the foot.

The upper 105 also defines a cavity that receives the foot. Specifically, the heel 130, lateral side 135, medial side 140, instep 145, and toe cage 150 cooperate to define an interior cavity into which a foot is inserted by way of an access opening or collar 155. The collar 155 may be finished with, e.g., fabric tape applied via adhesive. In an embodiment, a strip of material is applied around an inside edge of collar 155 to allow the edge of collar to be finished without a binding to reduce fraying and/or to help collar adhere to the skin of the user. The material may be an elastomeric and/or tacky polymer such as, but not limited to, polyurethane, silicone, nylon, and polyester.

The upper 105 includes a composite structure including a plurality of layers secured together. In particular, the upper includes a thermoformable textile or fabric laminate. The textile laminate includes one or more fabric (textile) layers, one or more foam layers, and/or one or more optical layers, where the fabric laminate is capable of being shaped via compression molding.

The one or more fabric layers provided in the fabric laminate can comprise any suitable textile, herein defined as fabrics and other manufactured products made from strands such as fibers, filaments, and yarns. By way of example, the textiles include knit, woven, nonwoven, embroidered, and braided constructions. The strands forming the fabric may include hard yarns or resilient yarns possessing stretch and recovery characteristics. Specifically, the hard yarns may include any one or combination of compounds selected from the group consisting of polyurethanes, polyesters (e.g., polyethylene terephthalate), polyolefins (e.g., polyethylene and polypropylene), polyamides (e.g., aliphatic or aromatic polyamide materials, such as nylon), and any suitable combinations or copolymers thereof. Regarding elastic yarns, the strands include elastomeric materials such as a polyester-polyurethane copolymer commercially available under the names elastane, LYCRA and SPANDEX.

A fabric layer can further be formed of synthetic or natural leather or may even further comprise a plurality of layers (e.g., a plurality of layers comprising waterproof and breathable properties, such as fabric layers commercially available under the name GORETEX). The fabric layers can include elastomers that provide any suitable degree of stretch (e.g., two way stretch or four way stretch) at any one or more locations of the upper.

The fabric layers may possess any thickness suitable for its described purpose. In example embodiments, the fabric layers can have thicknesses in the range of about 0.25 mm to about 4 mm, e.g., about 0.50 mm to about 3 mm.

The one or more foam layers provided in the fabric laminate can comprise any suitable one or more type(s) of open and/or closed cell foam materials that provide adequate cushioning and comfort for the intended purpose. In particular, an open-celled, thermoplastic foam may be utilized. Some examples of types of foam materials suitable for use in forming the upper include, without limitation, polyolefins (e.g., polyethylene or polypropylene) foam materials, ethylene vinyl acetate (EVA) foam materials and polyurethane (PU) foam materials. The foam materials can have a thickness that is greater than the fabric materials. In example embodiments, the foam materials can have thicknesses in the range of about 1 mm to about 10 mm, e.g., about 2 mm to about 8 mm (e.g., about 3 mm to about 6 mm). Foam layers can vary in thickness depending upon where such foam layers are located along the upper.

The optical effect layer possesses an aesthetic that differs from one or more of the other layers forming the textile laminate (e.g., the outermost layer of the upper). By way of example, the optical layer possesses a higher degree of brightness than the other layers forming the composite. By way of further example, the optical effect layer may be a metal foil layer or a holographic layer. Still further, the optical effect layer may be a reflective or lenticular properties, or may be transparent or translucent. The optical layer may also be any desirable material, including a fabric or film (polymer or metal).

Example textile laminate packages used to form portions of the upper for the shoe depicted in the figures include a series of layers as follows (from internal or foot facing side to external side of the upper): fabric layer/foam layer/reinforcing fabric layer/foam layer/fabric layer. For fabric laminate layers that include an optical layer, the optical layer can be provided as a layer disposed at any location within the fabric laminate such that at least one layer is located on one side of the internal structural support layer and at least one layer is located on the other side of the internal structural support layer.

In an example embodiment, one or more of the fabric layers can comprise polyester and/or an elastomer material (e.g., elastane), the foam layers can comprise an open cell PU or EVA foam material, and the internal structural support member layer can comprise a TPU plastic material. In a further example embodiment, one or both the inner and outer fabric layers can comprise a fabric material including about 85% polyester and about 15% elastane (weight 215 g/m$^2$), and the reinforcement fabric layer can comprise a fabric including about 79% polyester and about 21% elastane (weight 210 g/m$^2$). The outer and inner fabric layers may possess similar or different properties such as elongation properties. By way of example, the outer fabric layer may possess a greater degree of elongation or elasticity along one or more dimensions (e.g., along a length and/or width of the outer fabric layer) in comparison to the inner fabric layer. Alternatively, the inner fabric layer may possess a greater degree of elongation or elasticity along one or more dimensions (e.g., along a length and/or width of the inner fabric layer) in comparison to the outer fabric layer Now turning to FIG. 2, the upper 105 includes a first, hindfoot or rearfoot portion 205 and a second or forefoot portion 210. The rearfoot portion 205 is coupled to the forefoot or forefoot portion 210 via one or more seamless coupling members 215, such as a fabric tape and/or adhesive. That is, the rearfoot portion 205 may be connected to the forefoot portion 210 in a seamless and/or stitchless manner. More specifically, in the depicted embodiment the upper 105 includes a first or lateral coupling member 215 disposed along the lateral side of the upper and a second or medial coupling member 215 disposed along the medial side of the upper. By way of example, the portions 205, 210 of the upper 105 may be connected via a fabric tape such as a thermal adhesive tape (e.g., BEMIS seam tape, available from Bemis Associates, Inc., Shirley, Mass.). In a preferred embodiment, the coupling member 215 comprises fabric similar to the fabric forming the upper (e.g., polyester, spandex, etc.). In the depicted embodiment, the lateral and medial coupling members 215 each couple the rearfoot portion 205 to the forefoot portion 210 along substantially vertical joints (i.e., at or along terminal edges 335, 360 of the rearfoot portion 205, which are described in further detail below in connection with FIG. 3).

With this configuration, the coupling member 215 provides a seamless connection that minimizes and/or eliminates the friction caused by conventional (exposed) seams. That is, a seamless connection is provided because the coupling member 215 creates a generally uninterrupted and/or continuous surface along the interior surface and/or exterior surface of the upper 105. Additionally or alternatively, the rearfoot 205 and dorsum 210 portions may be connected without stitching, such as by utilizing a thermoplastic film that traverses the seam between adjacent portions, bonding the portions 205, 210 together (e.g., SEWFREE tape, available from Bemis Associates, Inc., Shirley, Mass.). In still other embodiments, ultrasonic welding could be utilized. As one example, individual pieces may be joined by ultrasonic welding, and the weld may be covered by a strip of heat sealable film. Regardless of how coupling members 215 are used, the coupling member 215 may possess a curved or undulating shape to track the contours of the upper portions 205, 210.

Moreover, regardless of how the upper 105 is formed, the resultant upper 105 is coupled (e.g., mounted) to the sole structure 110, e.g., via an adhesive, welding (e.g., ultrasonic welding), etc. In some embodiments, the rearfoot portion 205 of the upper 105 may be secured to the sole structure 110 via welding or adhesive. Additionally or alternatively, all or a part of the rearfoot portion 205 may be secured to the sole structure via stitching.

Generally, the sole structure 110 is a durable, wear-resistant component configured to provide cushioning as the article footwear 10 impacts the ground. In an embodiment, the sole structure 110 may include an insole, a midsole, and an outsole. In other embodiments, the sole may be a unitary and/or one-piece structure. The sole structure 110 may be formed of a single material or may be formed of a plurality of materials. By way of example, the sole structure may include a primary structure formed of a first material (e.g., ethylene vinyl acetate) and a secondary structure formed of a second material (e.g., thermoplastic polyurethane). In an embodiment, the primary structure is a midsole and the secondary structure is an outsole and the first material and second material may possess different relative wear ration and/or shoe hardness values. Additionally or alternatively, the sole structure 110 may include a midsole that is a polymer foam material such as ethylene vinyl acetate or polyurethane, while the outsole may be formed of various rubber compounds (blown rubber, carbon reinforced rubber) operable to provide a durable, wear-resistant surface for engaging the ground. Still further, the sole structure 110 may include an insole that is a relatively thin cushioning member located within the upper 105 and adjacent to a plantar surface of the foot, which is provided to enhance the comfort of wearer.

Figure 2:
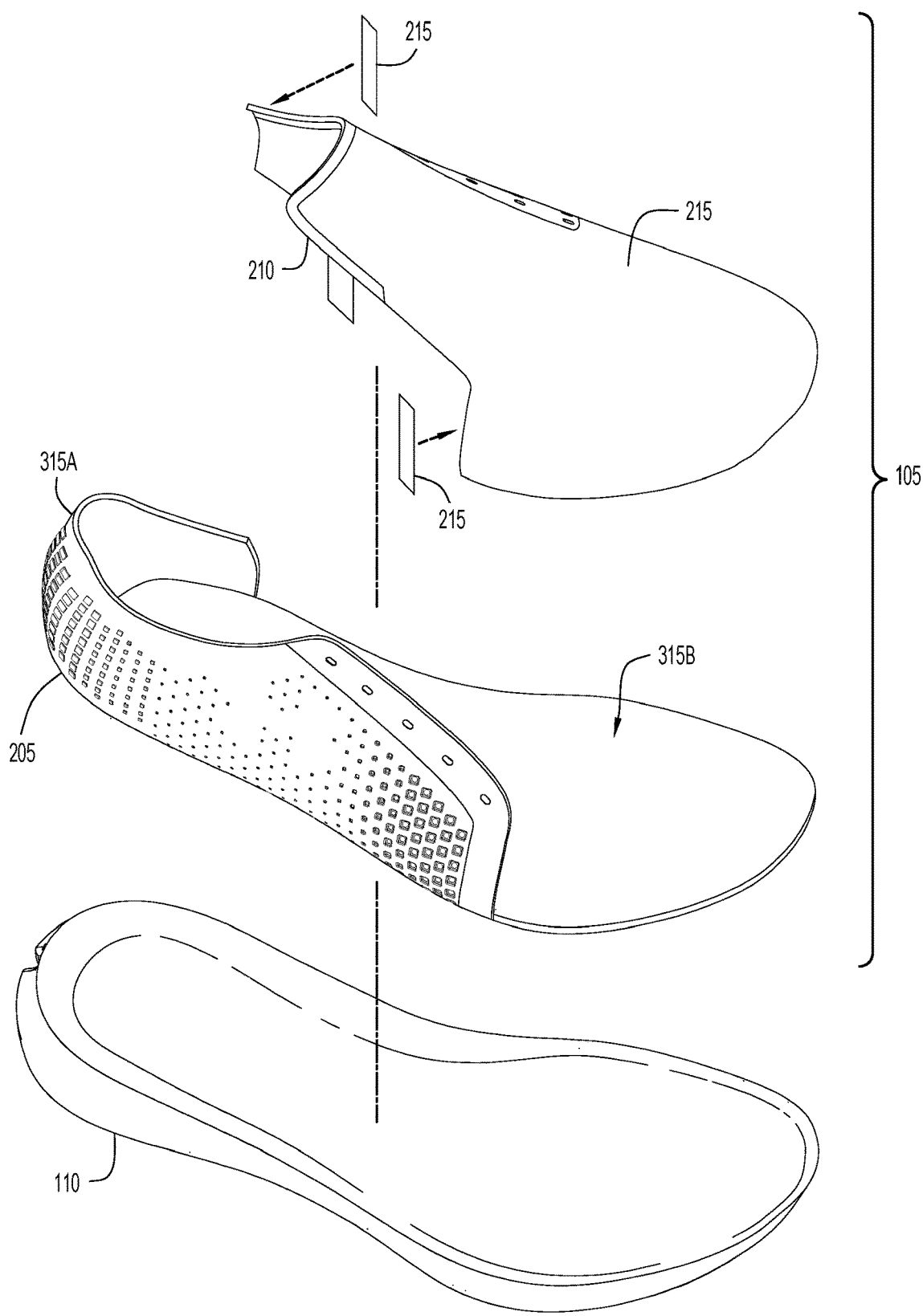
FIG. 2 is an exploded view of the article of footwear shown in FIG. 1A.

Now referring to FIG. 2, in the depicted embodiment, the rearfoot portion 205 generally covers the heel and planum (the area spanning the bottom of the foot) areas of the foot, but also extends along a side (e.g., the lateral side 135). However, in other embodiments, the rearfoot portion 205 need not cover hindfoot areas of the foot and may only extend around sides of the foot. That being said, in the depicted embodiment, the rearfoot portion 205 includes a heel support 315A and a planum support 315B extending forward from the heel support 315A. The heel support 315A is a self-supporting structure configured to surround the lateral side, medial side, and bottom of the heel bone (calcaneus). The planum support 315B extends forward from the heel support 315A to define various support regions, as is explained in further detail below in connection with FIG. 3. The forefoot portion 210, on the other hand, generally covers the dorsum (i.e., the top) of the foot and includes a proximal section 405A and a distal section 405B. The proximal section 405A generally defines lateral 135, medial 140, and instep 145 areas of the upper 105 while the distal section 450B generally defines the toe cage 150. However, the rearfoot portion 205 and forefoot portion 210 need not be mutually exclusive and individually define parts or portion of the footwear 10. Indeed, in the particular embodiment depicted in the Figures, the forefoot portion 210 and planar portion 205 overlap along at least a portion of the lateral side 135.

In embodiments including the planum support 315B of the rearfoot portion 205, the upper 105 (as defined by the rearfoot portion 205 and the forefoot portion 210) may be sockless and define a shell that encloses the foot. However, in other embodiments (i.e., embodiments without a planum support 315B), the upper 105 may be formed with an open bottom that is attached (e.g., stitched) to a stroble connected to the sole 110. That is, the rearfoot portion 205 may be formed without a planum support 315B and bottom edges of the heel support 315A and the dorsum support 210 may be attached (e.g., stitched) to the sole 110. Then, a sockliner may be set inside the footwear 10 to create a cushioned layer between the sole 110 and the foot that hides the joint between the upper 105 and the sole structure 110. By comparison, when the upper 105 is sockless and defines a shell that encloses the foot, the "insole" of the article of footwear 10 is effectively integrated into the upper 105 such that the heel and insole form a unitary structure (e.g., the interior layer of the textile laminate forming the upper 105 functions as the sock). Thus, in these embodiments, no further sock or insole is required (although a sock and/or insole may still be included in the footwear 10 (i.e., attached to the rearfoot portion 205) if desired). Stated another way, the interior surface of the rearfoot portion 205 is unitary (monolithic) and seamless, including a single piece (i.e., the rearfoot portion is not formed of joined components).

Figure 3:
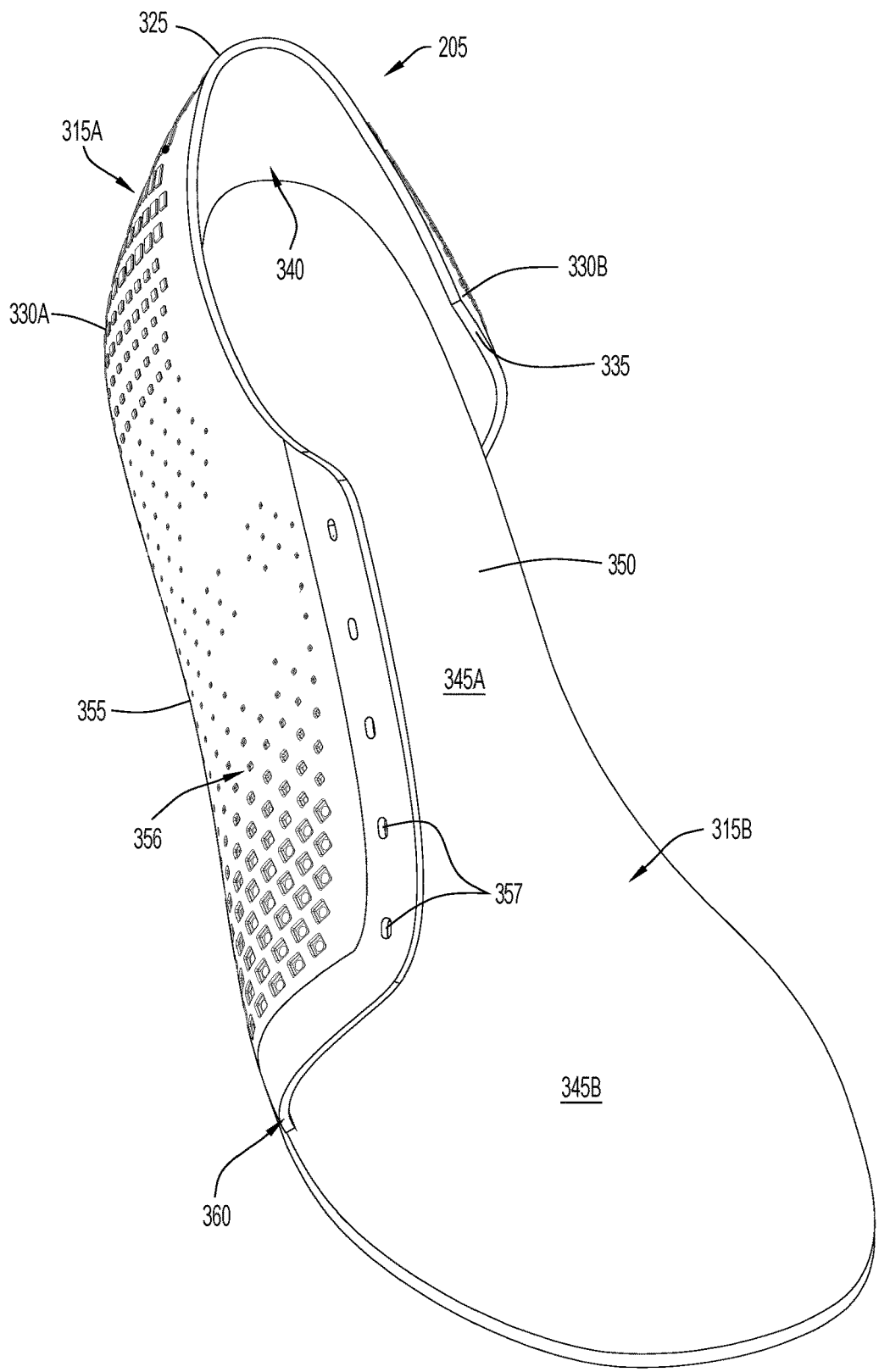
FIG. 3 is a top perspective view of a rearfoot portion of an upper of the footwear shown in FIG. 1A (upper configured for the right foot).

Now turning to FIG. 3, in the depicted embodiment, the planum support 315B includes a midfoot support region 345A and a forefoot support region 345B. The midfoot support region 345A is a generally U-shaped structure defining a bottom wall 350 and the forefoot support region 345B defines a generally planar member configured to span the ball and toes of the foot. Meanwhile, the heel support 315A includes a wall 325 that extends around a curved heel pocket or cup 340, to a lateral portion 330A and a medial portion 330B. The wall 325 also curves forward at its lower end, transitioning to the planum support 315B (or the sole 110 if the upper 105 is formed without a planum support 315B). That is, the vertical wall 325 cooperates with the planum support 315B (or sole 110) to define the curved heel pocket or cup 340. In a further embodiment, the vertical wall 325 may curve inward (toward the foot) as it travels upward (in the direction of the collar 155).

Still referring to FIG. 3, the medial portion 330B of the wall 325 terminates at an edge 335 that is disposed in the rear footwear region 115 of the footwear 10 while the lateral portion 330A extends forwards towards the forward footwear region 125, through the intermediate footwear region 120, and terminates at an edge 360. Consequently, the lateral side 330A defines a lateral panel 355 that extends along the arched area of the midfoot region (i.e., along the intermediate footwear region 120). As is explained in further detail below, the lateral panel 355 may extend over a portion of the forefoot portion 210 when the upper 105 is formed and terminal edge 360 of the lateral panel 355 may be attached (with the coupling member 215) to a corresponding edge or portion of the forefoot portion 210.

The lateral panel 355 may also include or define features (i.e., perforations 356 and/or grommets 357) therein, the formation of which is also described in detail below. At least some of the features (e.g., the perforations 356) add visual interest to the article of footwear by exposing an interesting sublayer included in the lateral panel 355. More specifically, the features (e.g., perforations) may remove a top layer of material from a textile laminate (which is formed from a plurality of layers) used to form a portion of the article footwear (e.g., rearfoot portion 205). Removing the top layer exposes a sublayer of the fabric laminate, which may have a different aesthetic (e.g., a different color) from the top layer and, thus, this exposure may add aesthetic features to the seamless rearfoot portion 205 and/or article of footwear without adding any seams thereto (i.e., without negating the seamless nature of the article of footwear or a portion thereof). That is, perforations and/or selectively removed material may expose a sublayer of a fabric laminate (the optical layer) and since the bottom (or middle) layer may have a different esthetic as compared to the top layer, exposing the bottom layer may create a new aesthetic for the lateral panel 355 and/or the article of footwear.

In the depicted embodiment, at least some of the perforations 356 include apertures formed therein, and the perforations 356 and apertures decrease in size from a front of the lateral panel 355 to a back of the lateral panel 355. However, in other embodiments, the perforations 356 may include in any design, pattern, or configuration. That is, the article of footwear may include an array of perforations arranged in any pattern across any seamless portion of the article of footwear. Additionally, the perforations 356 may be formed when the rearfoot portion 205 is formed, as is explained in more detail below in connection with FIGS. 5A-C, 6A-C, 7, and 8. Meanwhile, grommets 357 are aligned with a top edge of the lateral panel 355.

Still referring to FIG. 3, when the rearfoot portion 205 is formed with the planum support 315B (i.e., so that the upper 105 is sockless), the heel cup 340 of the rearfoot portion 205 may be seamless so that the heel 130 of the footwear 10 is seamless. However, in other embodiments, the rearfoot portion 205 may be formed without the planum support 315 and the heel cup 340 may include a seam (e.g., a welded seam or a stitched seam) to connect the bottom edge of the heel support 315A to a sole 110. Regardless, the heel cup 340 does not include any vertical seams (i.e., along the connection between lateral and medial halves of the heel). Instead, the heel 130 is a unitary structure shaped to define a unitary heel cup 340 (with the only potential seems extending around an exterior edge of the planar portion of the heel). In fact, in some embodiments, the entire rearfoot portion 205 is seamless, with the heel cup 315A and the planum support 315B forming a unitary and/or one-piece structure. As a specific example, the lateral panel 355 may include various perforations 356, but may be seamless (i.e., no seams extend therethrough). Advantageously, the perforations 356 add an aesthetic feature to the seamless lateral panel 355 without adding seams to the lateral panel 355.

Figure 4:
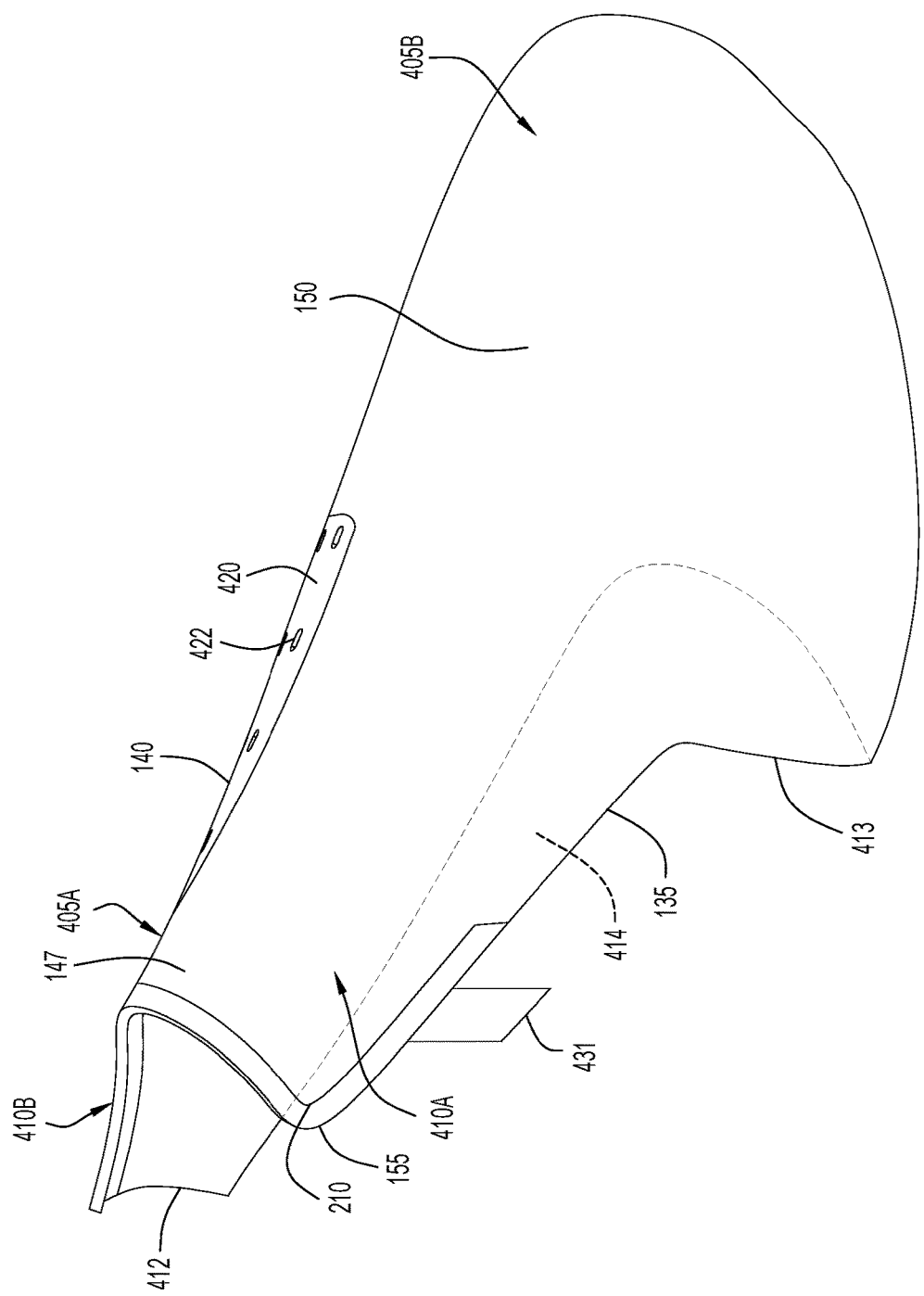
FIG. 4 is a top perspective view of a forefoot portion of the upper of the footwear shown in FIG. 1A (upper configured for the right foot).

Referring next to FIG. 4, as mentioned, the forefoot portion 210 includes a proximal section 405A and a distal section 405B. The proximal section 405A of the forefoot portion 210 includes a lateral flap 410A and a medial flap 410B that are each generally planar members. In this embodiment, the lateral flap 410A and the medial flap 410B each extend into or are unitary with the distal section 405B of the forefoot portion 210 and are connected via the tongue 147. However, in other embodiments, the lateral flap 410A and the medial flap 410B may be separated by an opening and the tongue may extend across the opening (i.e., beneath the lateral flap 410A and the medial flap 410B).

Generally, the forefoot portion 210 is contoured to mate with terminal edges 355 and 360 of the heel support 315A included in rearfoot portion 205. That is, the lateral flap 410A and medial 410B flap of the forefoot portion 210 are cut in a fashion complementary to that of the rearfoot portion 205, so that flaps 410A and 410B can be brought into adjacent relationship with the terminal edge 360 of the lateral portion 330A of wall 325 (i.e., the lateral panel 355) and the terminal edge 335 of medial portion 330B of wall 325, respectively. More specifically, the medial flap 410B includes an edge 412 that is disposed in the rear footwear region 115 of the footwear 10 and configured to mate with the terminal edge 335 of the medial portion 330B of the wall 325 of the heel support 315A (of the rearfoot portion 205). Meanwhile, the lateral flap 410A includes an edge 413 disposed in the intermediate footwear region 120 (adjacent the forward footwear region 125) that is configured to mate with the terminal edge 360 of the lateral panel 355 of the rearfoot portion 205.

This mating allows the forefoot portion 210 to be quickly connected to the rearfoot portion 205. For example, in some embodiments, the corresponding edges (i.e., edges 360 and 413, as well as edges 335 and 412) are stitched together, and the coupling member 215 (e.g., fabric tape) is applied such that the coupling member bridges the connection between the portions 205, 210, covering the stitching. However, in other embodiments, the coupling member 215 (e.g., fabric tape) is applied to the corresponding edges without any prior stitching. Preferably, the coupling member 215 is disposed on both the interior and exterior surfaces of the upper 105. Heat is then applied to the coupling member 215 to seal the seam, fixing the member to the upper 105.

In the depicted embodiment, the shape and size of the lateral portions of the forefoot portion 210 and the rearfoot portion 205 (i.e., the lateral flap 410A and the lateral panel 355, respectively) provide an overlapping portion in the upper 105. In particular, the lateral panel 355 of the rearfoot portion 205 extends over an overlapped portion 414 (shown in dashed lines) of the lateral flap 410A. Since the coupling members 215 do not extend through the overlapped portion 414, the overlapped portion 414 may be free to move within the forefoot portion 210. However, if the overlapped portion 414 is free to move over too wide of a range, the collar 155 may not tension the tongue 147 (and the forefoot portion 410) against the foot of a wearer. Consequently, the overlapped portion 414 may be connected to the forefoot portion 210 via an elastic connector 431 that biases the collar 155 to an appropriate size. By way of example, the connector 431 may be formed from an elastomeric and/or tacky polymer material such as, but not limited to, polyurethane, silicone, nylon, and polyester. In order to ensure that the connection between the elastic connector 431 is robust, the collar 155 may extend into the overlapped portion 414 and the connector 431 may be coupled directly to the extension of the collar 155 (which may be reinforced as compared to the flaps 410A, 410B of the forefoot portion 210)

Still referring to FIG. 4, the medial flap 410B (or, more generally, a medial side of the forefoot portion 210) includes or defines eyelets/grommets 422 that may be utilized, together with the eyelets or grommets 357 included on the rearfoot portion 205, to secure a fastener 127 (i.e., a shoelace) to the footwear 10 and allow a wearer to tighten the footwear 10. In the depicted embodiment, the eyelets/grommets 422 are included on a reinforced portion 420 of the forefoot portion 210. The reinforced portion 420 may prevent tearing, ripping, or other unwanted actions when the fastener 127 is tightened. It should be understood, however, that any fastener connections, such as channels or loops may be included in the footwear in other embodiments. Additionally, the distal section 405B of the forefoot portion 210 includes the toe cage 150, which covers/houses the toes of the wearer. The toe cage 150 is configured to cooperate with the forefoot support region 345B of the rearfoot support to define a single cavity within the upper 105 that receives all of the toes of the foot. In an embodiment, the forefoot portion 210 possesses a unitary (one piece) construction.

Figure 5A:
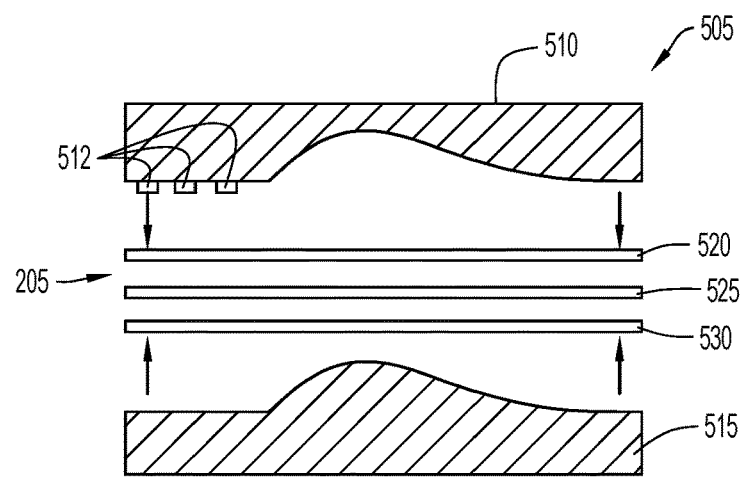
FIG. 5A illustrates a cross sectional view of a compression molding apparatus, showing upper formation according to a first embodiment of the invention.
Figure 5B:
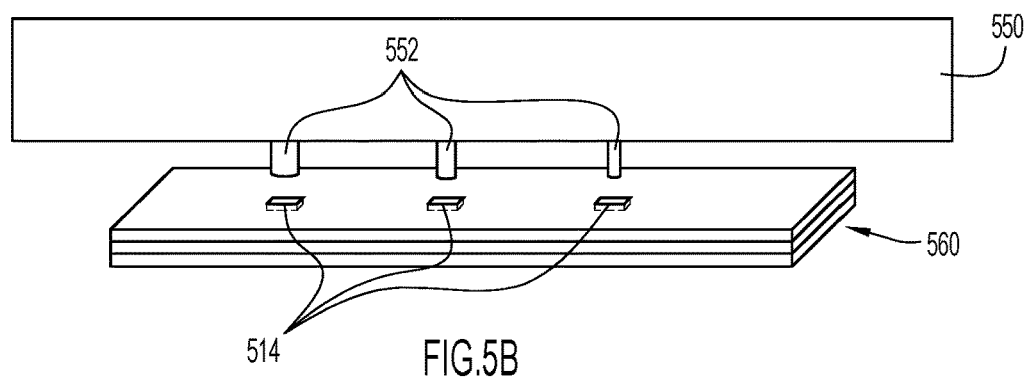
FIG. 5B illustrates a side perspective view of a die cutting apparatus, showing upper formation according to the first embodiment of the invention.
Figure 5C:
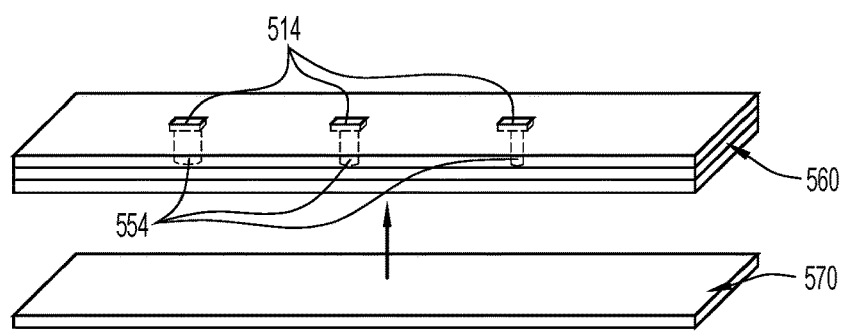
FIG. 5C illustrates a side perspective view of finishing operations performed during upper formation according to the first embodiment of the invention.
Figure 6A:
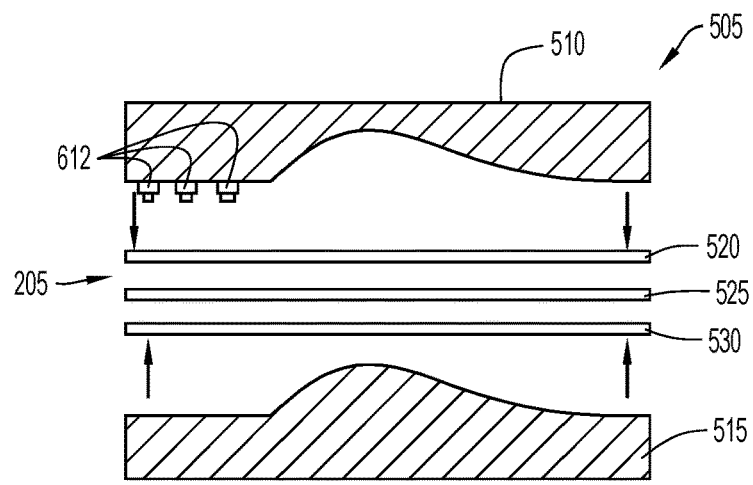
FIG. 6A illustrates a cross sectional view of a compression molding apparatus, showing upper formation according to a second embodiment of the invention.
Figure 9A:
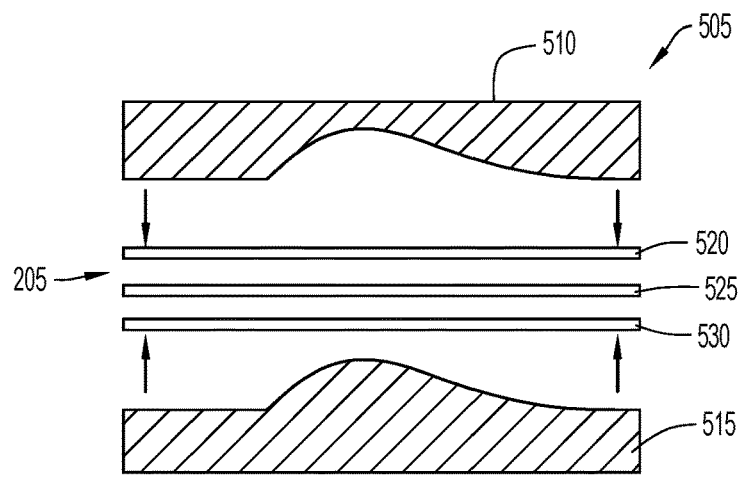
FIG. 9A illustrates a cross sectional view of a compression molding apparatus, showing upper formation according to a third embodiment of the invention.

Now turning to FIGS. 5A-C, 6A-C, and 9A-C, as mentioned above, each of the rearfoot portion 205 and the forefoot portion 210 may be primarily formed/shaped via a compression molding process (also call thermoforming). The compression molding process used to form the fabric laminate of the upper comprises a method of molding in which the molding material is first placed in an open, heated mold cavity. The mold is closed with a top force or plug member, pressure is applied to force the material into contact with all mold areas, while heat and pressure are maintained until the molding material has cured. The temperatures and pressures used in the compression molding process will depend upon the materials used to form the various layers within the fabric laminate, where softening of one or more layers is required to ensure suitable adhesion of the layers together during the compression molding process. In particular, softening of the one or more layers comprises being heated to a temperature that is lower than the melting point of the materials forming the layers (e.g., the softening temperature is at least about 20° C. lower than the melting point of the materials forming the layers). Example softening temperatures used during the compression molding process can be in the range from about 130° C. to about 200° C. (e.g., about 140° C. to about 190° C.). Exemplary compression molding apparatuses are illustrated in FIGS. 5A, 6A, and 9A. These apparatuses are largely similar, but include slightly different molding features that are configured to create different types of features in the upper, such as perforations that align a fabric laminate with a cutting apparatus and/or openings or holes that eliminate the need for a cutting apparatus. However, since the compression molding process is generally the same, the compression molding apparatuses are labeled with many like reference numerals to indicate like components.

More specifically, the compression molding apparatuses 505 shown in FIGS. 5A, 6A and 9A each include a first or female molding portion 510 configured to receive a second or male molding portion 515 possessing a shape complementary to the shape of the first molding portion. However, and as is described in further detail below, the female molding portion 510 included in FIG. 5A includes a first set of protrusions 512 while the female molding portion 510 included in FIG. 6A includes a second set of protrusions 612. The protrusions are shown enlarged in the Figures for clarity, but it should be understood that protrusions 512, 612 do not prevent or negatively impact compression molding. By comparison, the female molding portion 510 included in FIG. 9A does not include any protrusions.

With this configuration (depicted in FIGS. 5A-C and 6A-C), the female molding portion 510 and the male molding portion 515 fuse a multilayered package to form the composite or laminate structure, while the set of protrusions 512, 612 form perforations, cut-outs or windows into one or more layers of the composite. Meanwhile, in FIGS. 9A-C, the female molding portion 510 and the male molding portion 515 shape a single layer structure or a multilayered structure without forming the windows. Consequently, different operations are performed in the different embodiments to fully form the features (i.e., liner-backed openings). Each of these operations are described in detail below in connection with FIGS. 5A-C, 6A-C, and 9A-C.

In operation, a fabric laminate 560 is formed utilizing the compression molding apparatus 505. The compression molding process is described in further detail below with reference to FIGS. 5A, 6A, and 9A; however, generally, due to the protrusions 512 included in the female portion 510 of the apparatus, the laminate 560 is formed with perforations 514 formed therein. In an embodiment, the perforations are registry marks, serving to serve as positional identifiers for subsequent processing, including cutting. Accordingly, the fabric laminate 560 is then inserted into a cutting apparatus 550 with a set of cutting blades 552, as shown in FIG. 5B. In an embodiment, the blades 552 are aligned with the perforations 514 and then pressed into the fabric laminate 560 (e.g., in unison) to create a pattern of windows, apertures or holes 554 (see FIG. 5C) in the fabric laminate 560. For example, the apparatus may be a die cutting apparatus and the blades 552 may punch holes 554 (see FIG. 5C) through the fabric laminate 560. The cutting apparatus 550 may be effective because the fabric laminate 560 may lay substantially flat when removed from the molding apparatus 505.

During the cutting process, the perforations 514 formed in the fabric laminate 560 properly align the blades 552 of the cutting apparatus 550 with the fabric laminate 560. That is, the perforations 514 register an alignment of the fabric laminate 560. By comparison, without the perforations 514, the edges of the fabric laminate 560 may need to be aligned with various alignment points or artifacts which may increase the difficulty of producing two fabric laminates with matching holes 554. Since identical reproduction is especially important for mass production, where repeatability is incredibly important and small increments of extra time exponentially impact the timeliness and cost of a production chain, the perforations 514 may be critical for mass production.

In some embodiments, once holes 554 and perforations 514 are formed in a fabric laminate 560, the optical effect layer 570 (i.e., an optical or aesthetic layer viewable from outside of the shoe) may be added to the fabric laminate 560, as is shown in FIG. 5C. In an embodiment, the optical effect layer 570 is secured to the fabric laminate 560 adjacent interior layer 530. For example, the optical effect layer 570 may be glued to the interior layer 530 via heat pressing. By way of further example, the optical effect layer 570 may be an intermediate layer positioned between the interior layer 530 and the exterior layer 520 (e.g., adjacent the exterior layer). However, in other embodiments, the optical effect layer 570 may be added to the fabric laminate in any desirable manner.

Regardless of how the optical effect layer 570 is added to the fabric laminate 560, the optical effect layer 570 is an optically distinct layer (e.g., color viewable through the holes 554) creating a new and interesting aesthetic for an upper 105. For example, the optical effect layer 570 possesses aesthetic properties that differ from those of the other layers of the composite (e.g., the interior layer 510 and the exterior layer 520).

In other embodiments, the same effects of the optical effect layer 570 may be achieved by including the optical effect layer 570 in the compression molding (or configuring the interior layer 530 as the optical effect layer 570) and only cutting the holes 554 in one or more layers of the composite to expose the optical effect layer. That is, the holes may be cut selectively through less than all the layers of the composite structures (e.g., removing only a portion of the exterior layer), creating partial through holes that expose an intermediate or sublayer of the fabric laminate 560 and, in particular the optical effect layer 570.

Figure 6B:
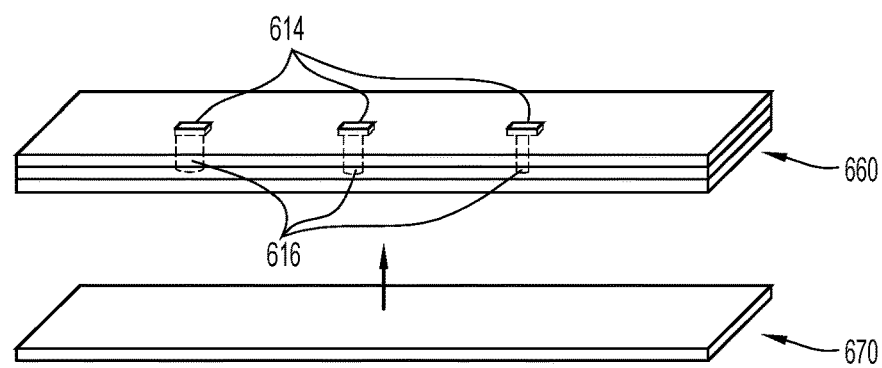
FIGS. 6B and 6C illustrate side perspective views of finishing operations performed during upper formation according to the second embodiment of the invention.
Figure 6C:
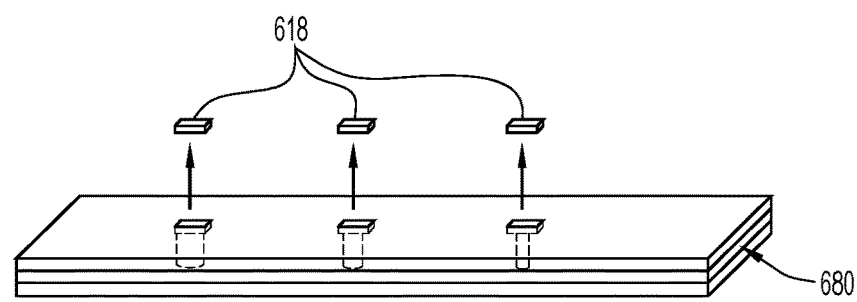

Next, in FIGS. 6A-C, an upper 105 is formed with perforations and apertures with only compression molding or compression molding and minor finishing operations. Initially, a fabric laminate 660 is formed with the compression molding apparatus 505. As mentioned, the compression molding process is described in further detail with reference to both FIGS. 5A, 6A, and 9A; however, generally, due to the protrusions 612 included in the female portion 510 of the apparatus, the laminate 660 is formed with perforations 614 and/or holes or windows 616 formed therein. Consequently, the fabric laminate 660 need not be acted upon by the die cutting apparatus when the apparatus 505 include protrusions like those included in set 612. Instead, an optical effect layer 670 may be added directly to the fabric laminate 660, as is shown in FIG. 6B.

The optical effect layer 670 is similar to optical effect layer 570 and, thus, any description of optical effect layer 570 included above is to be understood to apply to optical effect layer 670. For example, the optical effect layer 670 may be metallic to provide a color or aesthetic effect that can be seen through the holes 616. Moreover, as mentioned above, in some embodiments, the optical effect layer 670 may be included into the laminate 660 during molding and, thus, need not be added to the laminate 660 subsequent to molding (and the holes 616 would not extend through the optical effect layer 670). However, for brevity, the entire description of optical effect layer 570 is not repeated here.

In some embodiments, the features may be mostly formed during the compression molding and finished by adding the optical effect layer 670 to the fabric laminate 660. However, in other embodiments, portions 618 of the fabric laminate 660 may need to be removed from the laminate 660 to fully expose and finish the features. For example, if the molding apparatus cuts layers 520, 525, 530 during molding, some of the layers may fall away from the laminate 660 as the laminate 660 is removed from the molding apparatus 505, but others may need to be removed (i.e., peeled away) from the laminate 660. In FIG. 6C, the portions 618 correspond to the perforations 614 formed in the laminate 660.

Figure 9B:
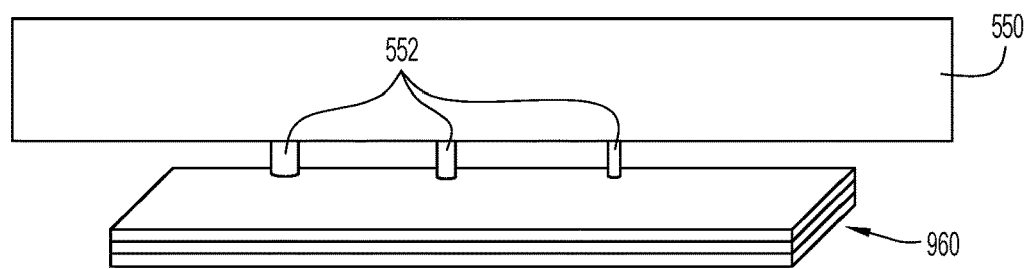
FIG. 9B illustrates a side perspective view of a die cutting apparatus, showing upper formation according to the third embodiment of the invention.
Figure 9C:
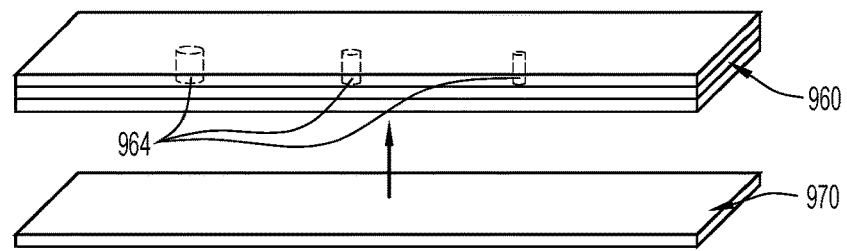
FIG. 9C illustrates a side perspective view of finishing operations performed during upper formation according to the third embodiment of the invention.

Third, and finally, in FIGS. 9A-C, an upper 105 (or a portion thereof, such as the rearfoot portion 205) is formed with liner-backed apertures through a combination of compression molding and cutting. Initially, a fabric laminate 960 is formed with compression molding apparatus 505. The compression molding process is described in further detail below with reference to FIGS. 5A, 6A, and 9A; however, generally, the compression molding apparatus 505 in FIG. 9 forms a fabric laminate without any holes, perforations, or other such features. The fabric laminate 960 is then inserted into a cutting apparatus 550 with a set of cutting blades 552, as shown in FIG. 9B. The blades 552 are pressed into the fabric laminate 960 (e.g., in unison) to create a pattern of apertures or holes 964 (see FIG. 9C) in the fabric laminate 960. For example, the apparatus may be a die cutting apparatus 505 and the blades 552 may punch holes 964 (see FIG. 9C) through the fabric laminate 960. The cutting apparatus 550 may be effective because the fabric laminate 960 may lay substantially flat when removed from the molding apparatus 505. Put another way, the fabric laminate 960 may be suitable for die cutting because the fabric laminate 960 (or at least the portion to be cut, such as panel 355) may lay substantially flat.

Once holes 964 are formed in a fabric laminate 960, an optical effect layer 970 (i.e., an optical or aesthetic layer viewable from outside of the shoe) may be added to the fabric laminate 960, as is shown in FIG. 9C. In an embodiment, the optical effect layer 970 is secured to the fabric laminate 960 adjacent interior layer 530. For example, the optical effect layer 970 may be glued to the interior layer 530 via heat pressing. However, in other embodiments, the optical effect layer 970 may be added to the fabric laminate in any desirable manner.

Regardless of how the optical effect layer 970 is added to the fabric laminate 560, the optical effect layer 970 may add an optically distinct layer (e.g., color viewable through the holes 554) and, thus, may create a new and interesting aesthetic for an upper 105. As some examples, the optical effect layer 970 may be a different color as compared to the exterior layer 520, may be metallic, reflective, see-through, etc. The optical effect layer 970 may also be any desirable material, including a fabric or film and/or may be or serve as a liner for the shoe. Additionally or alternatively, the optical effect layer may be utilized to secure different accessories or features to the upper 105. For example, loops or tubes for a fastener 127 could be secured to the fabric laminate 560 when the optical effect layer 570 is attached thereto. The optical effect layer 970 need not extend entirely around the interior of a shoe and, instead, may simply cover any holes 964 created in the shoe (or a portion thereof). If the optical effect layer 970 is a lining, the optical effect layer 970 (i.e., a colored lining) may span only the array of holes with other lining material covered the rest of the shoe. Alternatively, the optical effect layer may be covered with another layer of material that serves as a lining.

Now referring generally to FIGS. 5A and 6A, in these Figures, the sets of protrusions 512 and 612 are illustrated with only three protrusions; however, it is to be understood that a set of protrusions may include any number of protrusions and the protrusions may span any length of the upper 105 (i.e., along a length of the lateral panel 355 of the rearfoot portion 205). Moreover, the sets of protrusions 512, 612 may be arranged in any pattern and may vary in size or shape, as desired. For example, the protrusions in the sets of protrusions 512, 612 may each be square, circular, or a combination of shapes. The protrusions in the sets of protrusions 512, 612 may also be the same size (thickness and/or length) or vary in shape and size, for example, along the length of a shoe.

By way of example, in FIGS. 5A and 6A, the sets of protrusions 512 and 612 each include square protrusions of the same size. Consequently, identical perforations are formed across a portion of the upper 105 (i.e., across the lateral panel 355) formed with protrusions 512 and 612. However, in set 612, the circular portions of the protrusions vary in size, thickening from left to right in FIG. 6A. Consequently, set 612 forms different sized openings within the perforations 614, for example, decreasing in size from front to back of the lateral panel 355. A similar configuration of features is included in the lateral side 135 of the upper 105 of the article of footwear 10 shown in FIGS. 1A-1D, and 2-4.

That is, in the embodiment illustrated in FIGS. 1A-1D, and 2-4, the lateral side 135 includes a plurality of perforations 356 and at least some of the perforations 356 include apertures formed therein (not labeled in FIGS. 1A-1 and 2-4). The apertures and perforations 356 are relatively consistent or uniform in the rear footwear region 115, decrease in size (i.e., diameter) moving from the rear footwear region 115 towards the intermediate footwear region 120 and then increase in size moving from the intermediate footwear region 120 to the forward footwear region 125 of the article of footwear 10. This may create an array of colored spots/specks (with the colored spots being created by a colored sublayer that is exposed by the apertures) across the length of the shoe, with more color visible in the rear footwear region 115 and the forward footwear region 125 (since these regions include larger apertures). That all being said, different embodiments may include any desired array of liner-backed openings to create any desired aesthetic effect in a seamless portion of an article of footwear.

Now referring generally to FIGS. 5A, 6A, and 9A, in the embodiments depicted in these Figures, a rearfoot portion 205 of an upper 105 is being formed. The rearfoot portion 205 includes three layers—an outer or exterior layer 520, a middle or intermediate layer 525, and an inner or interior layer 530. By way of example, the exterior layer 520 may be a breathable, synthetic fabric (e.g., a polyester fabric), the intermediate layer 525 may be open-celled foam (e.g., ethylene vinylacetate), and the interior layer 530 may be a breathable, synthetic fabric (e.g., a polyester fabric).

Additionally, the exterior layer 520 and/or the interior layer 530 may further include an elastic fiber (e.g., spandex or elastane) to provide the layers with elastic properties. In an embodiment, the exterior layer 520 is fabric including 85% polyester and 15% spandex (weight 215 g/m2), the intermediate layer 525 is polyurethane foam, and the interior layer 530 is fabric including 79% polyester and 21% spandex (weight 210 g/m2). Additionally or alternative, the exterior 520 and interior 530 fabric layers may possess similar or different properties such as elongation properties. By way of example, the exterior layer 520 may possess greater elongation along its length than the interior layer 530, while the interior layer 530 may possess greater elongation along its width then the exterior layer 520. Still further, the outer 520 and/or inner 630 layers may be formed of leather, GORETEX, etc.

Regardless of the material included in or between the layers 520, 525, 530, upon compression (and the application of heat), the layers 520, 525, 530 adhere, forming a fabric laminate. The fabric laminate conforms to the shape of the molding portions 510, 515, permanently holding its shape. In this manner, the rearfoot portion 205 of the upper 105 may be formed, possessing the shape of the mold and including any features that are created by the sets of protrusions 512, 612 included in the mold (the forefoot portion 210 may also be formed in this manner). This formation process enables the creation of a macrostructure of the upper 105 (the general shape of the rearfoot 205 and dorsum 210 portions of the upper), and also enables the creation of any microstructure included of the upper. Here, the microstructure comprises a plurality of perforations (i.e., perforations 514/614) and/or openings/holes (i.e., holes 554/616).

Figure 7:
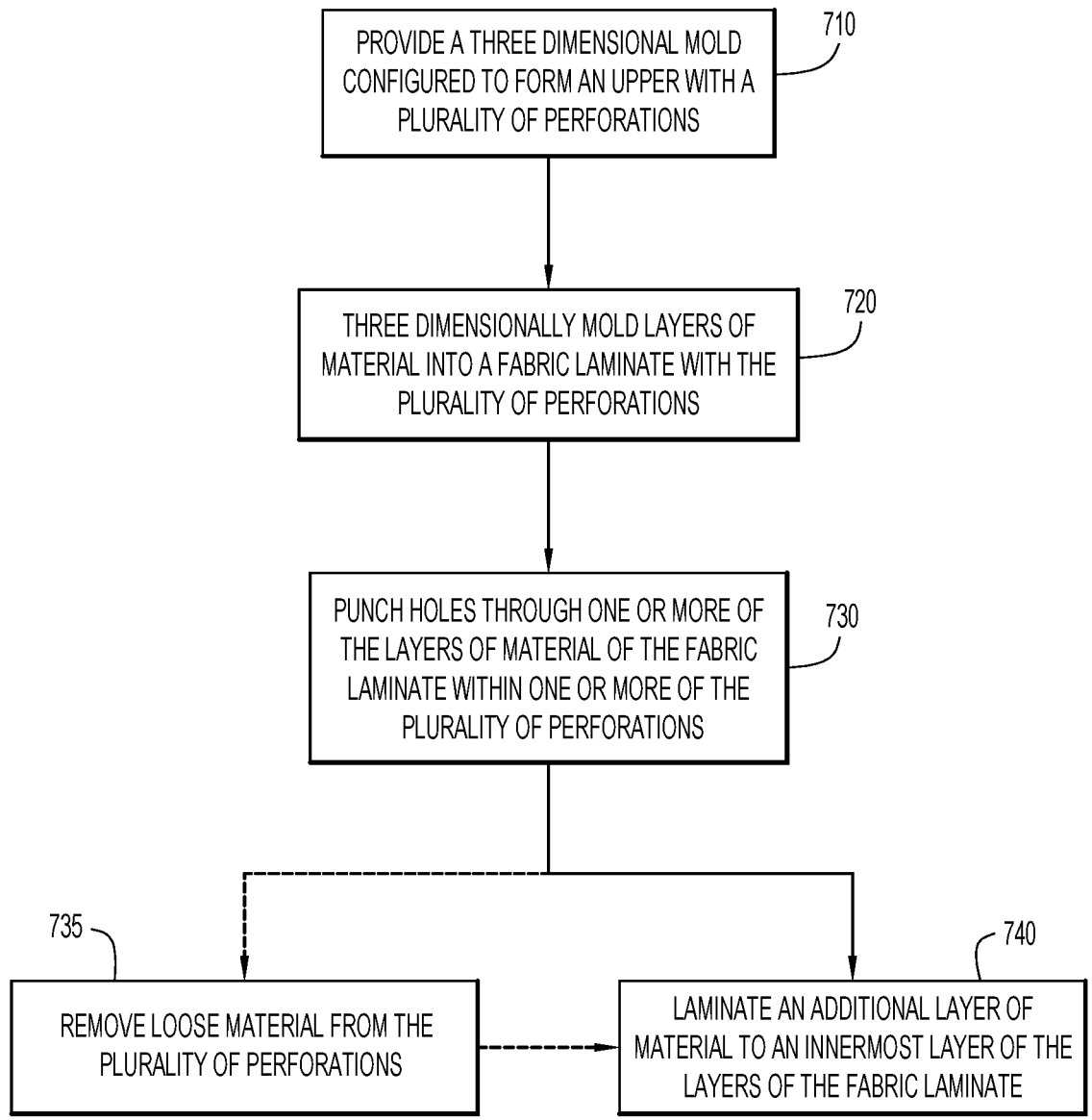
FIG. 7 is a high-level flow chart illustrating a method of upper formation corresponding to the first embodiment illustrated in FIGS. 5A-C.

Now turning to FIG. 7, but with reference to FIGS. 5A-C, for a description of the basic steps for forming an upper in accordance with at least one embodiment of the present invention. Initially, at 710, a three dimensional mold that is configured to form an upper with a plurality of perforations is provided. For example, and as is shown in FIG. 5A, a mold with a set of protrusions configured to form perforations in fabric layers during compression molding of the fabric layers is provided in or installed in a compression molding apparatus 505. Then, at 720, layers of material are three dimensionally molded with the mold. This forms at least a portion of an upper (i.e., lateral panel 355 of rearfoot portion 205) with perforations.

At 730, holes are punched through one or more of the layers. At least some of the holes are aligned within the molded perforations so that the fabric laminate from the molding apparatus is easily aligned with the cutting apparatus. For example, as described above in connection with FIG. 5B, at least some of the perforations 514 may be aligned with blades 552 of a cutting apparatus 552 and then holes 554 may be punched through the fabric laminate. However, not all of the holes need to be aligned with the perforations. For instance, the perforations may align a certain number of blades to ensure an identical pattern of holes is provided over multiple uppers, but some holes may be intentionally offset from the perforations. For example, some holes may be offset from the perforations to provide eyelets or grommets.

In some instances, loose material may be removed from the fabric laminate at 735. For example, if optical effect layer 570 is included in the fabric laminate 560, loose material from non-through cuts (i.e., partial cuts) may be removed. Finally, at 740, an optical effect layer is secured to an innermost layer of the fabric laminate. For example, optical effect layer 570 is glued to the innermost side of fabric laminate 560, as described above in connection with FIG. 5C. Typically, an optical effect layer will not be secured to the innermost side of the fabric laminate 560 when loose material is removed from the fabric; however, in at least one embodiment, an optical effect layer is added to create an two-layered effect that can be seen through the holes punched through the fabric laminate (i.e., a reflective, a translucent layer may be combined with a metallic or reflective layer to create an interesting aesthetic).

Figure 8:
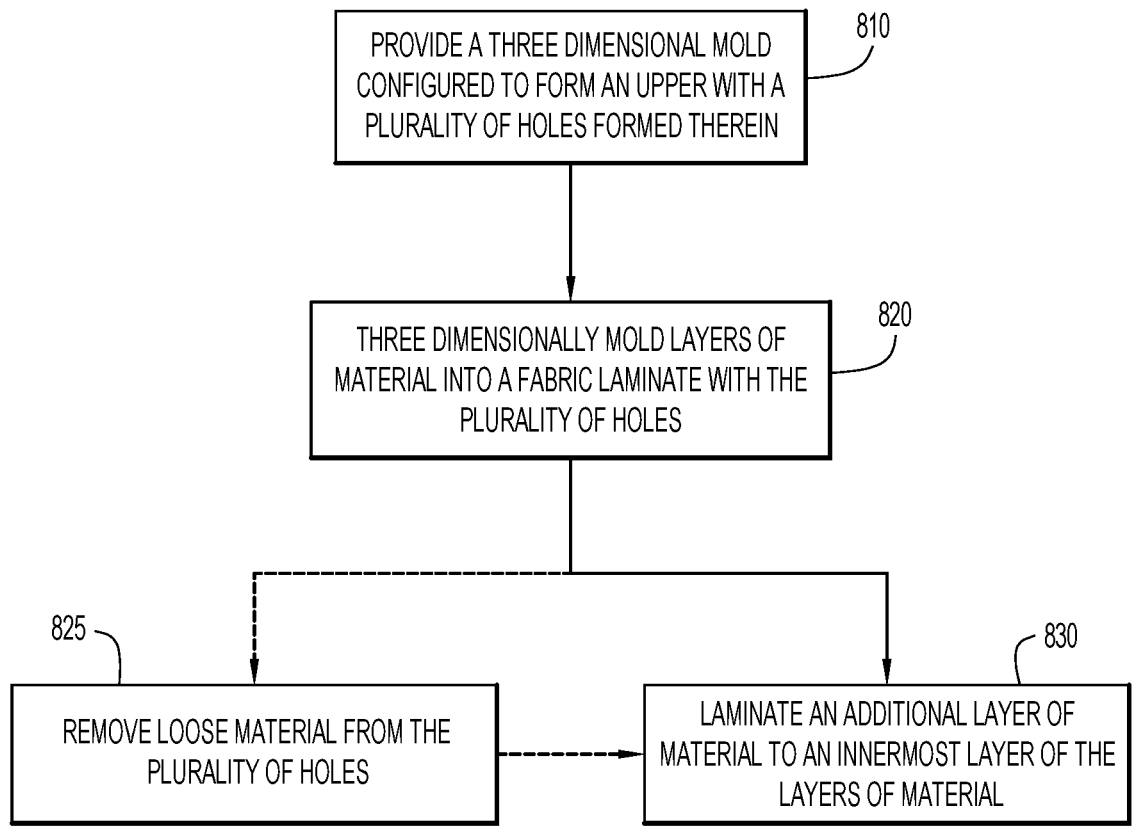
FIG. 8 is a high-level flow chart illustrating a method of upper formation corresponding to the second embodiment illustrated in FIGS. 6A-C.

Now turning to FIG. 8, but with reference to FIGS. 6A-C, for a description of a high-level method of forming an upper in accordance with at least one embodiment of the present invention. Initially, at 810, a three dimensional mold that is configured to form an upper with a plurality of holes is provided. In some embodiments, the mold may also be configured to form perforations. For example, and as is shown in FIG. 6A, a mold with a set of protrusions 612 that is configured to form perforations and openings through fabric layers during compression molding of the fabric layers is provided in or installed in a compression molding apparatus 505. Then, at 820, layers of material are three dimensionally molded with the mold. This forms at least a portion of an upper (i.e., lateral panel 355 of rearfoot portion 205) with holes extending therethrough.

In some instances, loose material may be removed from the fabric laminate at 825. The loose material may be peeled away from perforations and/or pulled from any holes formed in the fabric laminate. Additionally or alternatively, if optical effect layer 670 is included in the fabric laminate 660 of FIG. 6B, loose material may be removed from partial holes (i.e., non-through holes) formed in the fabric laminate 660 to reveal the optical effect layer 670.

Finally, at 740, an optical effect layer of material is secured to an innermost layer of the fabric laminate. For example, optical effect layer 670 is glued to the innermost side of fabric laminate 560, as described above in connection with FIG. 6C. As mentioned above in connection with step FIG. 7, typically, an optical effect layer will not be laminated to the innermost side of the fabric laminate when loose material is removed from the fabric; however, in at least one embodiment, an optical effect layer is added to create an two-layered effect that can be seen through the holes punched through the fabric laminate.

Referring generally to 7 and 8, although the method described in FIG. 8 may seem to provide apertures while removing a step from FIG. 7, in at least some instances, it may be cheaper and simpler to form a combination of perforations and apertures through a combination of compression molding and cutting. More specifically, in at least some instances, fabric removal may be a labor intensive process and may require manual inspection and labor. Consequently, in at least some instances, processes that require fabric removal may be less efficient and more expensive (despite seemingly eliminating a step). Consequently, in at least some instances, distinct molding and cutting operations may be preferred. However, the operations need not be performed by distinct systems to provide this advantage and, instead, in at least some embodiments, may simply be performed at different times within a single apparatus or system.

Figure 10:
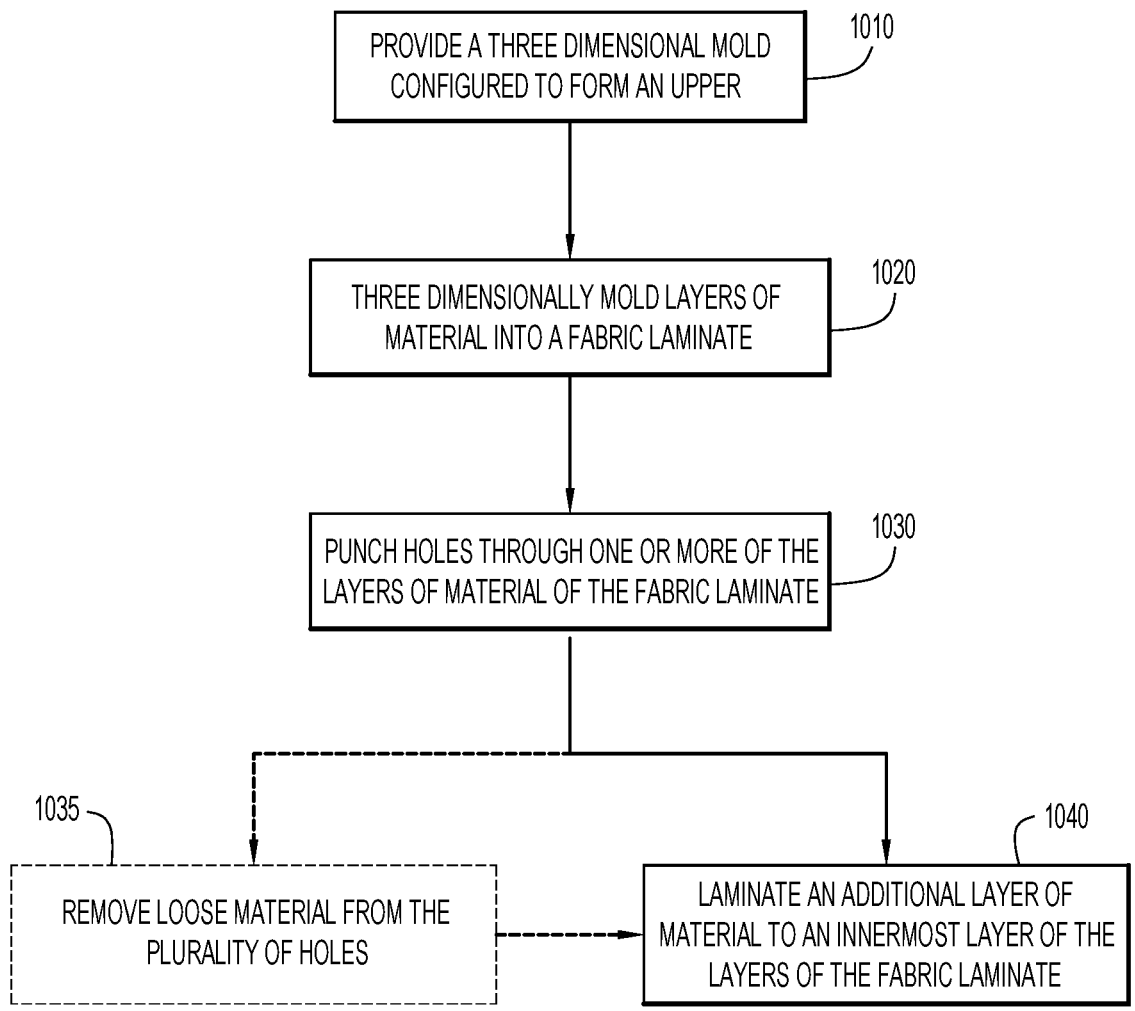
FIG. 10 is a high-level flow chart illustrating a method of upper formation corresponding to the third embodiment illustrated in FIGS. 9A-C.

Now turning to FIG. 10, but with reference to FIGS. 9A-C, for a description of the basic steps for forming an upper in accordance with at least one embodiment of the present invention. Initially, at 1010, a three dimensional mold that is configured to form an upper is provided. For example, and as is shown in FIG. 9A, a mold (without any protrusions) is provided in or installed in a compression molding apparatus 505. Then, at 1020, layers of material are three dimensionally molded with the mold. This forms at least a portion of an upper (i.e., lateral panel 355 of rearfoot portion 205).

At 1030, holes are punched through one or more of the layers. For example, as described above in connection with FIG. 9B, the fabric laminate 960 may be aligned with blades 552 of a cutting apparatus 552 and then holes 554 may be punched through the fabric laminate 960. In some instances, loose material may be removed from the fabric laminate at 1035. For example, if optical effect layer 970 is included in the fabric laminate 960, loose material from non-through cuts (i.e., partial cuts) may be removed. Finally, at 1040, an optical effect layer is secured to an innermost layer of the fabric laminate. For example, optical effect layer 970 is heat pressed to the innermost side of fabric laminate 960, as described above in connection with FIG. 9C.

While the invention has been described in detail and with reference to specific embodiments thereof, it will be apparent to one skilled in the art that various changes and modifications can be made therein without departing from the spirit and scope thereof. For example, portions 115, 120, 125 are not necessarily intended to demarcate precise areas of footwear 10 and may simply represent general areas of footwear to provide a frame of reference. Moreover, the upper 105 may be stylized as any shoe type. For example, the upper 105 may be stylized as a boot or high top athletic shoe that rises above the ankle of the wearer, terminating in a collar positioned above the inner ankle bone of the user, thereby providing a gapless gasket seal above the user's ankle. In such an embodiment, the upper includes a forefoot portion and a rearfoot portion as described above.

As noted above, the upper 105 or portions thereof may be formed of any material suitable for its described purpose. By way of example, the upper 105 maybe formed of flexible textile material of a predetermined gauge or density. Specifically, the upper 105 or portions thereof may be formed of, for example, knit, woven or non-woven material made using fibers such as, but not limited to, nylon, polyester, polyurethane and or spandex, with elastomeric properties. The fabric may be breathable (permitting the passage of fluid such as air or water therethrough), or may be non-breathable (preventing passage of fluid therethrough).

Moreover, the materials forming the rearfoot portion 205 of the upper 105 may be the same or different as that forming the forefoot portion 210 of the upper. For example, the rearfoot portion 205 may be formed of a different material than the forefoot portion 210. Specifically, the rearfoot portion may be formed of a breathable fabric in the manner described above and the rearfoot portion 205 may be formed of non-breathable fabric operable (i.e., to prevent the passage of fluid (e.g., water) therethrough), or vice versa. Also, the rearfoot portion 205 and the forefoot portion 210 portions may include different graphics thereon.

Still further, the interior layer 630 and the exterior layer 620 may be formed of the same textile or may be formed of different textiles. For example, the interior layer 630 may be a breathable fabric, while the exterior layer 620 may be formed of a natural or synthetic rubber such as polychloroprene (neoprene). Additionally, the rubber may be blended with other materials to provide desired properties (e.g., spandex to improve elasticity).

It is therefore intended that the present invention covers the modifications and variations of this invention provided they come within the scope of the appended claims and their equivalents.

The temperatures and pressures used in the compression molding process will depend upon the materials used to form the various layers within the fabric laminate, where softening of one or more layers is required to ensure suitable adhesion of the layers together during the compression molding process. In particular, softening of the one or more layers comprises being heated to a temperature that is lower than the melting point of the materials forming the layers (e.g., the softening temperature is at least about 20° C. lower than the melting point of the materials forming the layers). Example softening temperatures used during the compression molding process can be in the range from about 130° C. to about 200° C. (e.g., about 140° C. to about 190° C.).

It is to be understood that terms such as "top," "bottom," "front," "rear," "side," "height," "length," "width," "upper," "lower," "interior," "exterior," "medial," "lateral," and the like as may be used herein, merely describe points of reference and do not limit the present invention to any particular orientation or configuration. Moreover, while the invention has been described in detail and with reference to specific embodiments thereof, it will be apparent to one skilled in the art that various changes and modifications can be made therein without departing from the spirit and scope thereof.

I claim:

1. A method of forming an upper for an article of footwear comprising:
    compression molding multiple layers of fabric with heat and pressure that softens one or more of the multiple layers of fabric to cause the multiple layers of fabric to adhere together and form a fabric laminate defining a rearfoot portion or forefoot portion of the upper, the multiple layers of fabric including an interior textile layer, an intermediate foam layer, and an exterior textile layer;
    cutting a plurality of holes through one or more layers of the multiple layers of fabric laminate with a cutting apparatus; and
    laminating an optical effect layer of material to an innermost layer of the fabric laminate to provide an aesthetic effect that can be seen through the plurality of holes.

2. The method of claim 1, wherein the compression molding forms perforations in the fabric laminate and the method further comprises aligning the fabric laminate within the cutting apparatus by aligning the perforations with blades of the cutting apparatus.

3. The method of claim 2, wherein the perforations extend into the exterior textile layer and the plurality of holes extend through the interior textile layer, the intermediate foam layer and the exterior textile layer.

4. The method of claim 1, wherein the optical effect layer of material is an aesthetic layer and the plurality of holes expose the aesthetic layer.

5. The method of claim 4, further comprising removing material from the plurality of holes subsequent to the cutting.

6. A method of forming an upper for an article of footwear comprising:
    compression molding multiple layers of fabric with heat and pressure that softens one or more of the multiple layers of fabric to cause the multiple layers of fabric to adhere together and form a fabric laminate defining a rearfoot portion or forefoot portion of the upper, wherein the compression molding forms a plurality of holes in the fabric laminate; and
    laminating an optical effect layer of material to an innermost layer of the fabric laminate to provide an aesthetic effect that can be seen through the plurality of holes.

7. The method of claim 6, further comprising:
    removing loose material from the plurality of holes subsequent to the compression molding to expose the aesthetic effect.

8. The method of claim 6, wherein the multiple layers of fabric comprise:
    an interior layer, an intermediate layer, and an exterior layer, wherein perforations extend into the exterior layer and the holes extend through the interior layer, the intermediate layer and the exterior layer.

9. A method of forming an upper for an article of footwear comprising:
    compression molding multiple layers of fabric with heat and pressure that softens one or more of the multiple layers of fabric to cause the multiple layers of fabric to adhere together and form a fabric laminate defining a rearfoot portion or forefoot portion of the upper, wherein the compression molding forms perforations in the fabric laminate;

aligning the fabric laminate within a cutting apparatus by aligning the perforations with blades included in the cutting apparatus; and cutting a plurality of holes through one or more of the multiple layers of fabric laminate with the cutting apparatus to create an aesthetic effect.

10. The method of claim 9, further comprising laminating an optical effect layer of material to an innermost layer of the fabric laminate to provide the aesthetic effect, which can be seen through the plurality of holes.

11. The method of claim 6, wherein the optical effect layer of material comprises at least one of: a layer that has a higher degree of brightness than other layers of the multiple layers of fabric, a metal foil layer; a holographic layer, a reflective layer, or a transparent layer.

12. The method of claim 9, wherein the aesthetic effect is created by exposing an optical effect layer of material that comprises at least one of: a layer that has a higher degree of brightness than other layers of the multiple layers of fabric, a metal foil layer; a holographic layer, a reflective layer, or a transparent layer.

13. The method of claim 9, wherein the multiple layers of fabric comprise an interior textile layer, an intermediate foam layer, an exterior textile layer, and an optical effect layer of material, wherein the perforations extend into the exterior textile layer and the plurality of holes extend through at least the exterior textile layer to reveal the optical effect layer of material and create the aesthetic effect.

* * * * *